United States Patent
Nanri et al.

(10) Patent No.: US 10,339,394 B2
(45) Date of Patent: Jul. 2, 2019

(54) STEP DETECTION DEVICE AND STEP DETECTION METHOD

(71) Applicant: Nissan Motor Co., Ltd., Yokohama-shi, Kanagawa (JP)

(72) Inventors: Takuya Nanri, Kanagawa (JP); Abdelaziz Khiat, Kanagawa (JP); Hirotoshi Ueda, Kanagawa (JP); Fang Fang, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 3 days.

(21) Appl. No.: 15/749,901

(22) PCT Filed: Aug. 4, 2015

(86) PCT No.: PCT/JP2015/072084
§ 371 (c)(1),
(2) Date: Feb. 2, 2018

(87) PCT Pub. No.: WO2017/022079
PCT Pub. Date: Feb. 9, 2017

(65) Prior Publication Data
US 2018/0225526 A1    Aug. 9, 2018

(51) Int. Cl.
*G01C 3/08*    (2006.01)
*G01C 7/04*    (2006.01)
(Continued)

(52) U.S. Cl.
CPC ......... *G06K 9/00798* (2013.01); *G01C 3/085* (2013.01); *G01C 7/04* (2013.01);
(Continued)

(58) Field of Classification Search
None
See application file for complete search history.

(56) References Cited

U.S. PATENT DOCUMENTS 4,942,533 A * 7/1990 Kakinami ............... G01S 11/12
340/937
6,985,619 B1 * 1/2006 Seta .................... G06K 9/00798
382/154

(Continued)

FOREIGN PATENT DOCUMENTS

CN    103500338 A    1/2014
JP    2005217482 A    8/2005
(Continued)

OTHER PUBLICATIONS

Oniga, Florin, et al., "Curb Detection Based on a Multi-Frame Persistence Map for Urban Driving Scenarios", Proceedings of the 11th International IEEE Conference on Intelligent Transportation Systems Beijing, China, Oct. 12-15, 2008, pp. 67-72.
(Continued)

*Primary Examiner* — Fernando Alcon
(74) *Attorney, Agent, or Firm* — Young Basile Hanlon & MacFarlane, P.C.

(57) ABSTRACT

A step detection device detects the distance and the direction to a road surface around a vehicle, using a distance sensor mounted on the vehicle, and sets a first step determination position and a second step determination position on the road surface. Then, the step detection device calculates the height changes of the road surfaces at the first step determination position and the second step determination position based on the distance and the direction to the road surface, and detects a step on the road surface based on one of the step determination positions, the gradient of the height change of the road surface at the one being larger.

9 Claims, 22 Drawing Sheets

(51) Int. Cl.
*G06K 9/00* (2006.01)
*H04N 13/204* (2018.01)
*G08G 1/16* (2006.01)
*G06K 9/46* (2006.01)

(52) U.S. Cl.
CPC ............ *G08G 1/16* (2013.01); *H04N 13/204* (2018.05); *G06K 9/4633* (2013.01)

(56) References Cited

U.S. PATENT DOCUMENTS

| | | | |
|---|---|---|---|
| 8,108,119 B2* | 1/2012 | Southall | B60T 7/22 |
| | | | 382/103 |
| 9,676,330 B2 | 6/2017 | Takemae et al. | |
| 2002/0087253 A1* | 7/2002 | Jeon | G06K 9/00798 |
| | | | 701/93 |
| 2009/0103781 A1* | 4/2009 | Fleury | B60W 40/02 |
| | | | 382/104 |
| 2010/0054538 A1* | 3/2010 | Boon | G06K 9/00798 |
| | | | 382/104 |
| 2011/0063097 A1 | 3/2011 | Naka et al. | |
| 2011/0222732 A1* | 9/2011 | Higuchi | B60W 30/14 |
| | | | 382/104 |
| 2013/0148856 A1* | 6/2013 | Lu | G06K 9/00798 |
| | | | 382/104 |
| 2014/0086477 A1* | 3/2014 | You | B60W 40/06 |
| | | | 382/154 |
| 2015/0015384 A1* | 1/2015 | Shima | B60W 30/095 |
| | | | 340/435 |
| 2015/0165972 A1 | 6/2015 | Takemae et al. | |
| 2016/0304098 A1* | 10/2016 | Ito | G06T 7/593 |
| 2017/0003134 A1* | 1/2017 | Kim | B60R 1/00 |
| 2017/0270372 A1* | 9/2017 | Stein | G06T 7/11 |
| 2018/0047147 A1* | 2/2018 | Viswanathan | G06T 7/70 |
| 2018/0059666 A1* | 3/2018 | Izzat | G06K 9/00208 |
| 2018/0225525 A1* | 8/2018 | Sano | G06K 9/00798 |
| 2018/0365846 A1* | 12/2018 | Sumiyoshi | G06T 7/50 |

FOREIGN PATENT DOCUMENTS

| | | |
|---|---|---|
| JP | 2010072807 A | 4/2010 |
| JP | 2014002608 A | 1/2014 |
| JP | 2014085940 A | 5/2014 |
| WO | 2014064990 A1 | 5/2014 |

OTHER PUBLICATIONS

Zhao, Gangqiang, et al., "Curb Detection and Tracking Using 3D-LIDAR Scanner", Image Processing, 2012 19th IEEE International Conference, Sep. 30, 2012, pp. 437-440.

* cited by examiner

FIG. 25A
FIG. 25B
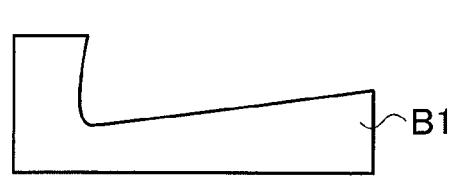
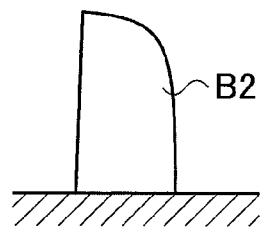

ation of a step detection device 1 according to a first embodiment;

STEP DETECTION DEVICE AND STEP DETECTION METHOD

TECHNICAL FIELD

The present invention relates to a step detection device and a step detection method for detecting a step on a road surface.

BACKGROUND

There has been known a roadside object detection apparatus which estimates the structure of the road surface around a vehicle using a parallax image captured by a stereo camera and detects a step on the road surface formed by roadside objects, such as a curb, from the structure of the road surface (see Japanese Patent Application Publication No. 2014-002608). The apparatus in Japanese Patent Application Publication No. 2014-002608 scans the height of the road surface along a horizontal scanning line of an image, and detects a step if the height change amount of the road surface is larger than or equal to a threshold.

Because of the influence of errors included in the structure of the road surface estimated from an image of the stereo camera, as the angle formed by the horizontal scanning line relative to the tangent direction of a step decreases, the gradient of the height change of the road surface becomes smaller. Accordingly, when the angle formed by the tangent of the step and the horizontal scanning line is small, the detection accuracy of the step position is low.

SUMMARY

The present invention has been made in view of the above problem and an object thereof is to provide a step detection device and a step detection method which are capable of detecting the position of a step on a road surface accurately.

A step detection device according to a first aspect of the present invention detects the distance and the direction to a road surface around a vehicle, using a distance sensor mounted on the vehicle, and sets a first step determination position and a second step determination position on the road surface. Then, the step detection device calculates the height changes of the road surfaces at the first step determination position and the second step determination position based on the distance and the direction to the road surface, and detects a step on the road surface based on one of the step determination positions, the gradient of the height change of the road surface the one being larger.

A step detection device according to a second aspect of the present invention sets the first step determination position on the road surface and calculates the height change of the road surface at the first step determination position based on the distance and the direction to the road surface. If the gradient of the height change of the road surface at the first step determination position is larger than or equal to a threshold, the road surface height calculation circuit does not calculate the height change of the road surface at the second step determination position, and the step on the road surface is detected based on the height change of the road surface at the first step determination position.

The present invention reduces the influence of errors included in the distance and the direction to a road surface detected by a distance sensor, and thus accurately detects the position of a step on the road surface.

BRIEF DESCRIPTION OF THE DRAWINGS

FIG. 25A is a cross-sectional view illustrating an example of a low curbstone block used in the road environment in Japan, and FIG. 25B is a cross-sectional view illustrating an example of a high curbstone block for defining a boundary between a sidewalk and a roadway.

DETAILED DESCRIPTION OF THE EMBODIMENTS

First Embodiment

Figure 1:
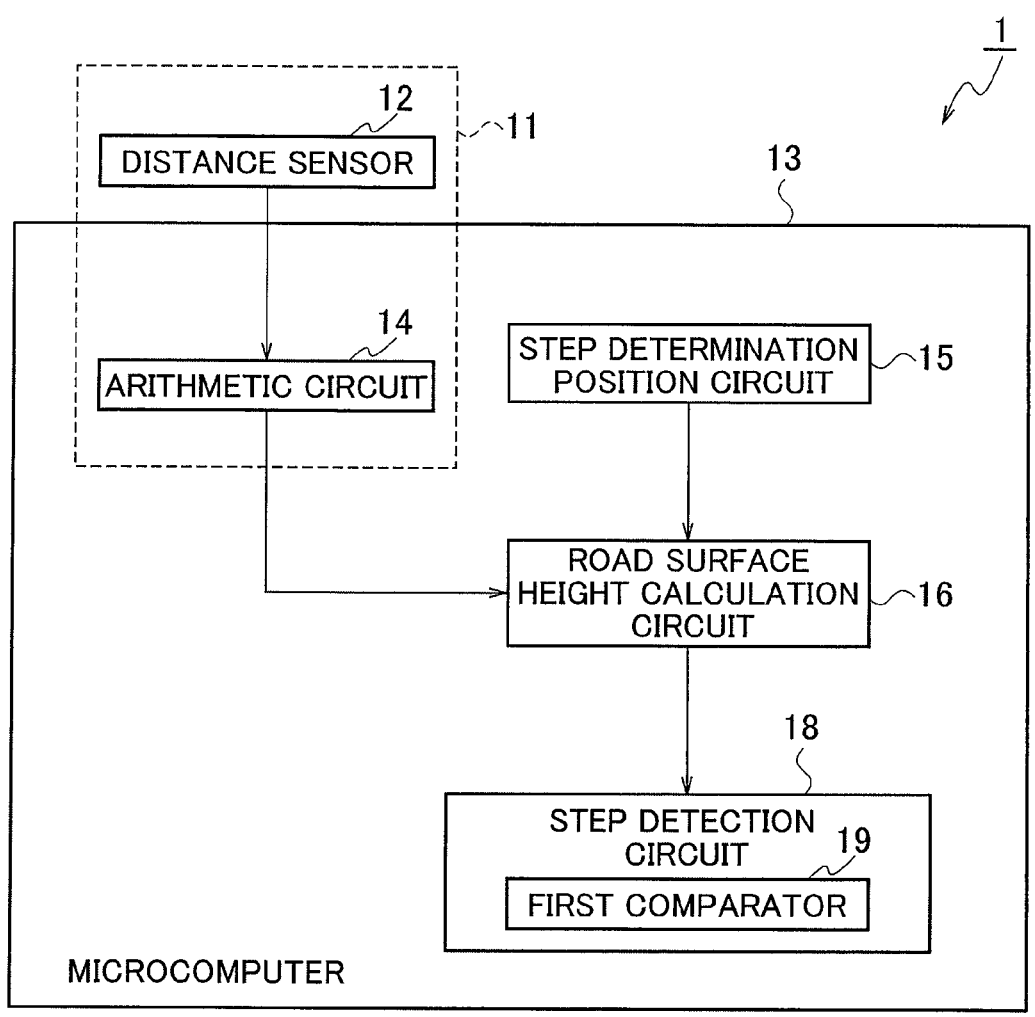
FIG. 1 is a block diagram illustrating the overall configuration of a step detection device 1 according to a first embodiment.

Next, embodiments will be described with reference to the drawings.

The overall configuration of a step detection device 1 according to a first embodiment will be described with reference to FIG. 1. The step detection device 1 detects the distance and the direction to the surfaces of objects (hereinafter referred to as "a road surface") including a road and a curb on the road around a vehicle and detects a step on the road surface based on height change of the road surface at multiple step determination positions which are in a linear shape in the vehicle width direction and set on the road surface.

Specifically, the step detection device 1 includes a distance sensor 12 for detecting the distance and the direction to a road surface around the vehicle and a microcomputer 13 for executing a series of information processing to detect a step on the road surface from distance measurement data including the distance and the direction to the road surface detected by the distance sensor 12.

An example of the distance sensor 12 is a stereo camera which shoots objects around a vehicle from multiple different directions simultaneously and thus can store also information in the depth direction (distances from the sensor 12) of the objects around the vehicle. By performing certain image processing on the stereo images (including a parallax image) obtained by the stereo camera, it is possible to acquire three-dimensional information of an object image appearing on the stereo images of an object around the vehicle. The objects around the vehicle include a road and a curb. The details will be described later.

The microcomputer 13 includes, for example, a general-purpose microcontroller equipped with a CPU, memory, and input-output unit and serves as multiple information processing circuits included in the step detection device 1 by executing a preinstalled computer program. The microcomputer 13 repeatedly executes at predetermined time intervals, a series of information processing cycles to detect a step on the road surface from the distance and the direction to the road surface detected by the distance sensor 12. The microcomputer 13 may also be used as an electronic control unit (ECU) used for other control of the vehicle.

The multiple information processing circuits which the microcomputer 13 serves as include an arithmetic circuit 14, a step determination position circuit 15, a road surface height calculation circuit 16, and a step detection circuit 18. The step detection circuit 18 includes a first comparator 19.

The arithmetic circuit 14 constitutes a distance measurement unit 11 together with the distance sensor 12, and performs, from stereo images obtained by the stereo camera, a series of stereo image processing to acquire three-dimensional information of object images appearing on the stereo images of objects around the vehicle.

For example, the arithmetic circuit 14 performs lens distortion correction processing for correcting distortion of stereo images caused by the lenses and performs parallelism correction processing for correcting the vertical position between stereo images (processing to make stereo images parallel and the same height). Then, the arithmetic circuit 14 performs stereo matching processing for estimating the correspondence between the pixels of stereo images. This makes it possible to calculate not only the two-dimensional coordinates of an object on the imaging plane of the stereo camera but also the distance from the imaging plane of the stereo camera to the object. Thus, it is possible to detect the distance and the direction to an object around the vehicle.

The lens distortion correction processing, for example, captures a flat plate with a black-and-white checkered pattern thereon with each camera and estimates a lens distortion parameter and a camera lens center parameter which allow the lattice points of the checkered pattern to be in a lattice shape constituted of rectangles. Here, this processing may be a common method for lens distortion correction, and the present embodiment has no particular limitation.

The parallelism correction processing, for example, captures a flat plate with a black-and-white checkered pattern thereon with both cameras of a stereo camera and estimates a spatial position parameter and angle parameter between the stereo cameras which allow the positions of the lattice points of the checkered pattern on the images of both cameras to be at the same vertical positions. Here, this processing may be a common method for parallelism correction processing, and the present embodiment has no particular limitation.

The stereo matching processing, for example, calculates which pixel in the right camera image each pixel in the left camera image is associated, with respect to the left camera image. For example, the stereo matching processing calculates the absolute values of the luminance value of each pixel in the left camera image and the luminance value of each pixel in the right camera image, as evaluation values, and calculates a pixel in the right camera image, of which the evaluation value is minimum, as the associated pixel. Methods of calculating the evaluation value include, for example, a method using the sum of absolute differences (SAD) or the sum of squared differences (SSD), or a method in which the evaluation calculation area includes not only a single point of each pixel but peripheral pixels of each pixel. Here, the method for calculating evaluation values may also be another common method, and the present embodiment has no particular limitation.

Figure 2:
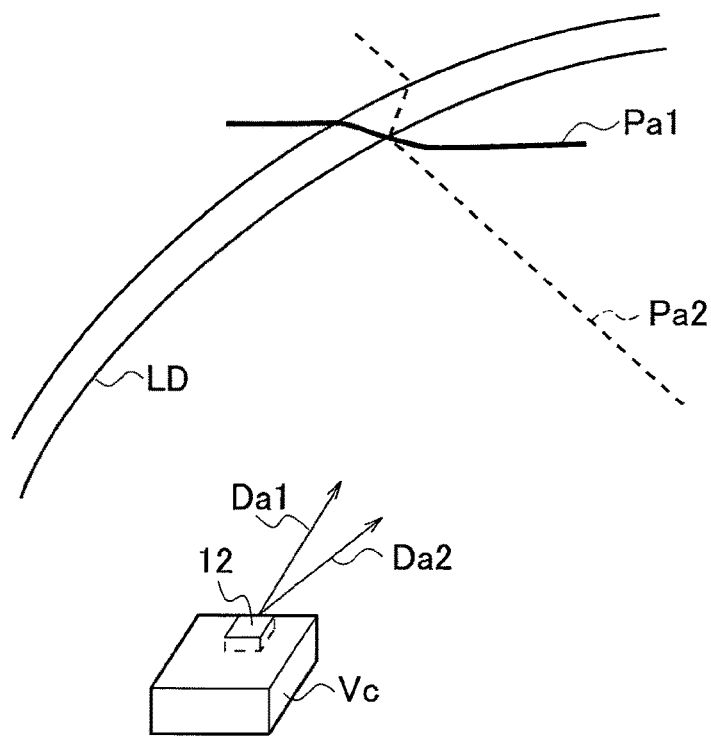
FIG. 2 is a perspective view illustrating an example of a first step determination position ($Pa_1$) and a second step determination position ($Pa_2$) which are in linear shapes and set on the road surface around a vehicle (Vc)
Figure 3:
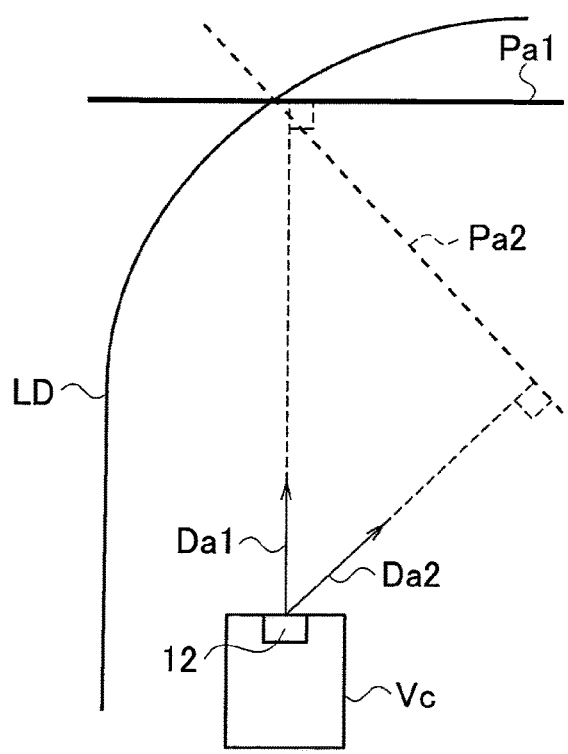
FIG. 3 is an overhead view corresponding to FIG. 2.

The step determination position circuit 15 sets a linear step determination position in the vehicle width direction on the road surface around the vehicle on the coordinates of the distance measurement data detected by the distance sensor 12. For example, as illustrated in FIGS. 2 and 3, the step determination position circuit 15 sets a first step determination position (Pa1), which is away from the distance sensor 12 in a first predetermined direction (Da1) by a first predetermined distance and extends in a direction orthogonal to the first predetermined direction (Da1), on the road surface on the coordinates of the distance measurement data. FIGS. 2 and 3 illustrate an example in which the distance sensor 12 is installed in the front of a vehicle (Vc), and the first predetermined direction (Da1) is set to be the traveling direction of the vehicle (Vc). Hence, the first step determination position (Pa1) extending in parallel with the vehicle width direction is set on the coordinates of the distance measurement data, being away from the vehicle (Vc) in the front direction by the first predetermined distance.

The step determination position circuit 15 further sets a second step determination position (Pa2), which is away from the distance sensor 12 in a second predetermined direction (Da2) by a second predetermined distance and extends in a direction orthogonal to the second predetermined direction (Da2), on the road surface on the coordinates of the distance measurement data. The second predetermined direction (Da2) is different from the first predetermined direction. Specifically, both the first predetermined direction (Da1) and the second predetermined direction (Da2) are set in a horizontal plane. The first predetermined direction (Da1) is not in parallel with the second predetermined direction (Da2), and the angle formed by the two directions is an angle except 0 degrees and 180 degrees.

Note that, as described later, the first predetermined distance and the second predetermined distance can be adjusted as appropriate such that the first step determination position (Pa1) and the second step determination position (Pa2) intersect each other in a step existing area. In addition, the first step determination position (Pa1) and the second step determination position (Pa2) are set on the stereo images within the image capturing area of the stereo camera. The first predetermined direction (Da1) is not limited to the traveling direction of the vehicle (Vc). Further, multiple step determination positions which are in directions different from the first predetermined direction (Da1) and the second predetermined direction (Da2) may be additionally set to determine a step.

In an example illustrated in FIGS. 2 and 3, a step (LD) having a steep change in the height of the road surface is formed at a road shoulder which is an end in the vehicle width direction of the roadway where the vehicle (Vc) can travel. Outside the roadway with the step (LD) as a boundary is provided a stepped portion (for example, a sidewalk or a road shoulder) the road surface of which is one step higher than the roadway. As described above, in the example illustrated in FIGS. 2 and 3, the road includes the roadway and the stepped portion (sidewalk or road shoulder), and between the roadway and the stepped portion (sidewalk or road shoulder) is formed the step (LD). The linear first step determination position (Pa1) and second step determination position (Pa2) extend in directions in which they cross the roadway, step (LD), and stepped portion (sidewalk or road shoulder).

Note that the positional relationship between the foregoing distance sensor 12 and the step determination positions (Pa1, Pa2) is a mere example. Another example will be described later with reference to FIG. 22.

The road surface height calculation circuit 16 calculates each of the changes of the height data at the measurement points of the road surfaces at the first step determination position (Pa1) and the second step determination position (Pa2), based on the distances and the directions to the road surfaces detected by the distance measurement unit 11.

Specifically, the road surface height calculation circuit 16 performs coordinate conversion processing on the distance and the direction to the road surface to acquire three-dimensional information on the objects (including the road and the curb) around the vehicle on the coordinates of the distance measurement data. The three-dimensional information on the objects around the vehicle includes three-dimensional information on the road surface (including the surfaces of the road and the curb) around the vehicle. Thus, the road surface height calculation circuit 16 can acquire the height of the road surface around the vehicle.

Figure 4:
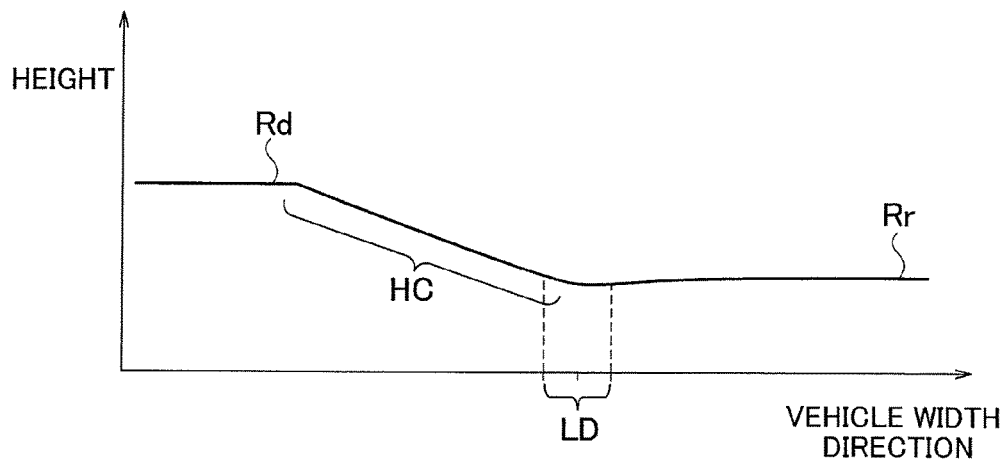
FIG. 4 is a graph illustrating a height change of a road surface at the first step determination position ($Pa_1$)
Figure 5:
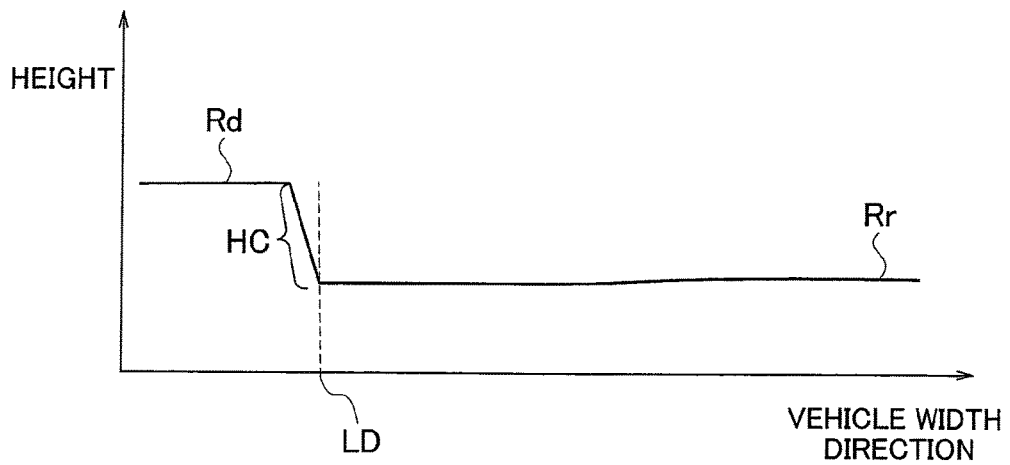
FIG. 5 is a graph illustrating a height change of a road surface at the second step determination position ($Pa_2$)

The road surface height calculation circuit 16 calculates height change of the road surface (distance measurement data) at each of the step determination positions (Pa1, Pa2) from the height of the road surface. FIG. 4 is a graph illustrating a height change of the road surface at the first step determination position (Pa1), and FIG. 5 is a graph illustrating a height change of the road surface at the second step determination position (Pa2). The vertical axes of FIGS. 4 and 5 represent the height of the road surface, and the horizontal axes represent the step determination positions (Pa1, Pa2) extending in the vehicle width direction.

As illustrated in FIGS. 4 and 5, the step (LD) is formed between a roadway (Rr) and a stepped portion (Rd). Specifically, the road surfaces of the roadway (Rr) and the stepped portion (Rd) have different heights and are connected by a road surface height changing portion (HC) at which the height of the road surface changes. The connecting portion of the road surface height changing portion (HC) and the roadway (Rr) is defined as "a step endpoint LD". The step includes the road surface height changing portion (HC) and the step endpoint LD. The step endpoint LD has a meaning of indicating a boundary of the roadway in the vehicle width direction where the vehicle can travel.

As illustrated in FIG. 5, if the gradient of the height change of the road surface at the road surface height changing portion (HC) is steep, it is possible to identify the position of the step endpoint LD accurately. However, as illustrated in FIG. 4, if the gradient of the height change of the road surface at the road surface height changing portion (HC) is gentle, it is difficult to identify the position of the step endpoint LD accurately. In other words, the steeper the gradient of the height change of the road surface at the road surface height changing portion (HC) is, the more accurately the position of the step endpoint LD can be identified.

Since the gradient of the height change of the road surface at the road surface height changing portion (HC) is determined using the cross-section at the step determination position (Pa1, Pa2) on the coordinates of the distance measurement data detected by the distance sensor 12, which is directed obliquely downward from the vehicle to the road surface, the gradient changes depending on the angle formed by the tangent of the step endpoint LD and the step determination position (Pa1, Pa2), as illustrated in FIG. 3. Specifically, at the intersection point of the step determination position (Pa1, Pa2) and the step endpoint LD, the closer to a right angle the angle formed by the tangent of the step endpoint LD and the step determination position (Pa1, Pa2) is, the steeper the gradient of the height change of the road surface at the road surface height changing portion (HC) is. In contrast, the smaller the angle formed by the tangent of the step endpoint LD and the step determination position (Pa1, Pa2) is, the more the cross-section taken by the step determination position (Pa1, Pa2) on the coordinates of the distance measurement data is inclined. Consequently, the gradient of the height change of the road surface at the road surface height changing portion (HC) is gentler. Thus, at the intersection point of the step determination position (Pa1, Pa2) and the step endpoint LD, the closer to a right angle the angle formed by the tangent of the step endpoint LD and the step determination position (Pa1, Pa2) is, the more accurately the position of the step endpoint LD can be identified.

In view of the above, the step detection circuit 18 detects the step on the road surface based on one of the first step determination position (Pa1) and the second step determination position (Pa2), the gradient of the height change of the road surface at which is larger than that at the other.

Specifically, the step detection circuit 18 includes the first comparator 19 for comparing the gradients of the height changes of the road surfaces at the first step determination position (Pa1) and the second step determination position (Pa2). For example, the first comparator 19 compares height change rates of the road surfaces at the step determination positions. The first comparator 19 may compare the average values of the height change rates at the road surface height changing portions (HC), or compare the height change rates only in the vicinities of the step endpoints LD.

The step detection circuit 18 selects a step determination position (FIG. 5) at which the height change rate is large, in other words, at which the gradient of the height change of the road surface is steep, and detects the position of the step endpoint LD at the boundary between the road surface height changing portion (HC) and the roadway (Rr) illustrated in FIG. 5. The method of detecting the position of the step endpoint LD is not particularly limited, but a known method may be used.

For example, the vicinity of the boundary between the road surface height changing portion (HC) and the roadway (Rr) is divided into multiple small sections. Then, the height change rate of each section is calculated. If the height changes in adjacent sections are larger than or equal to a predetermined threshold, the boundary between the adjacent sections may be identified as the position of the step endpoint LD.

Meanwhile, the road surface of the roadway (Rr) has a gradient (cant) such that the height decreases from the center toward the road shoulders at both ends. Considering the gradient around the step, after the step detection circuit 18 determines the existence of a step from the height change of the road surface at the first step determination position (Pa1), the road surface height calculation circuit 16 may further set a vicinity step determination position (ya) and extract the only distance measurement data of a certain gradient portion in the vicinity of the step to accurately detect the position of the step endpoint LD. Hereinafter, a specific method will be described.

First, the road surface height calculation circuit 16 detects a position, at which a height change larger than or equal to a predetermined height determination value has occurred, from the height change of the road surface at the first step determination position (Pa1) (FIG. 4). Specifically, as illustrated in FIG. 21A, the road surface height calculation circuit 16 estimates the height (HE) of the road surface of the roadway, and then, the step detection circuit 18 determines that a step exists if a height change larger than or equal to a height determination value (hD) occurs relative to the road surface height (HE) of the roadway.

Specifically, assuming that in the front direction of the distance sensor 12 exists a road surface area of the roadway, the center position (CVC) of the distance sensor 12 is calculated from the distance measurement data of the first step determination position (Pa1). Then, an area within a predetermined range from the center position (CVC) of the distance sensor 12 is extracted as a distance sensor center area (G1). Next, the height (HE) of the road surface in the distance sensor center area (G1) is estimated. The height direction of the distance sensor center area (G1) is discretely divided into sections, and the number of the distance measurement data of the distance sensor center area (G1) existing in each section is counted. The height of the section in which the number of counts is largest is regarded as the height (HE) of the roadway. Besides, also Hough transformation can be used to estimate the road surface height of the roadway.

Here, the center position (CVC) of the distance sensor 12 is the optimum position in the case where the distance sensor 12 is installed at a front portion of the vehicle Vc in the traveling direction. The center position (CVC) of the distance sensor 12 varies depending on the installation position of the distance sensor 12 on the vehicle Vc. Hence, a position considered to be most likely to be a road surface relative to the vehicle Vc can be set as an area for estimating the road surface height (HE) of the roadway.

Figure 21A:
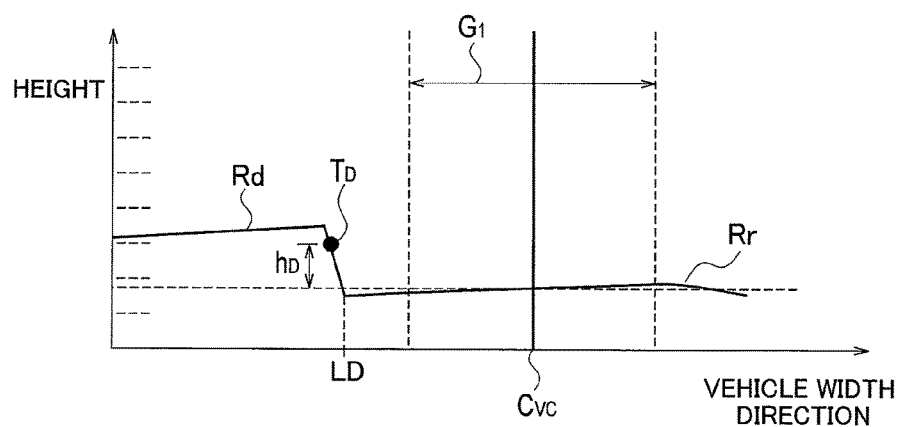
FIG. 21A is a diagram illustrating a step detection method by a road surface height calculation circuit 16.

As illustrated in FIG. 21A, if one of the measurement data exists at a position (TD) higher than the road surface height (HE) of the roadway by the amount larger than or equal to the height determination value (hD), the road surface height calculation circuit 16 determines that a step exists there. In addition to this, it is also possible to calculate local height changes continuing in the vehicle width direction and determine that a step exists if the height change is larger than or equal to a predetermined value.

Figure 21B:
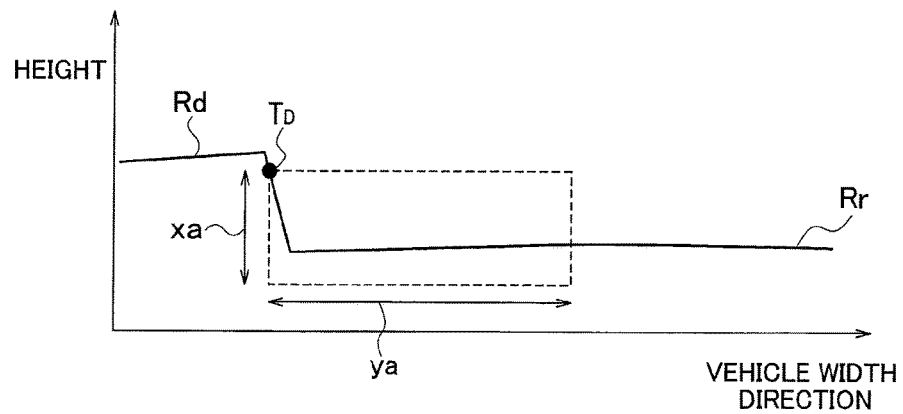
FIG. 21B is a diagram for explaining a setting range of a vicinity step determination position (ya)

Next, the road surface height calculation circuit 16 sets the vicinity step determination position by further limiting the range of the first step determination position (Pa1) in the height direction and the vehicle width direction. Specifically, as illustrated in FIG. 21B, the road surface height calculation circuit 16 sets, with respect to the height changing position (TD), a predetermined height (xa) downward in terms of the height direction and a predetermined distance (ya) toward the roadway in terms of the vehicle width direction to set the vicinity step determination position (ya). This makes it possible to extract the only distance measurement data of a certain gradient portion in the vicinity of the step, and thus to detect the position of the step endpoint LD accurately, even if the road surface of the roadway (Rr) has a gradient (cant) in which the height decreases from the center toward the road shoulders at both ends.

Figure 6:
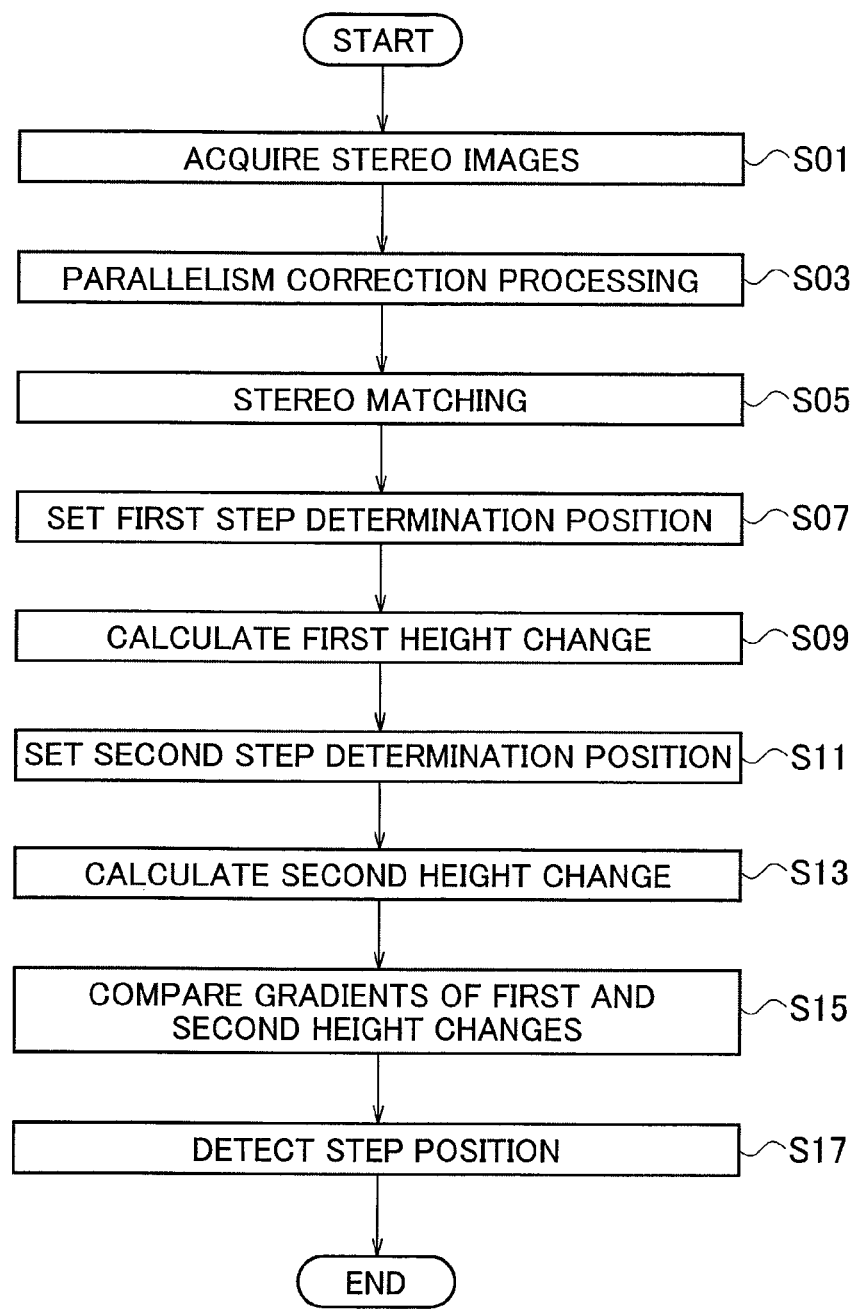
FIG. 6 is a flowchart illustrating an example of a step detection method using the step detection device 1 in FIG. 1.

With reference to FIG. 6, descriptions will be provided for an example of a step detection method using the step detection device 1 in FIG. 1. A series of processing operations shown in FIG. 6 is repeatedly executed in predetermined time cycles. First, at step S01, stereo images are acquired using a stereo camera which is an example of the distance sensor 12.

The process proceeds to step S03, where the arithmetic circuit 14 performs lens distortion correction processing for correcting distortion of the stereo images caused by the lenses and parallelism correction processing for correcting the vertical position between stereo images. The process proceeds to step S05, where the arithmetic circuit 14 performs stereo matching processing for estimating the correspondence between the pixels of the stereo images. Then, the arithmetic circuit 14 detects the distances and the directions to objects around the vehicle.

The process proceeds to step S07, where the step determination position circuit 15 sets the linear first step determination position (Pa1) extending in the vehicle width direction on the road surface around the vehicle, as illustrated in FIGS. 2 and 3. Then, the process proceeds to step 09, where the step determination position circuit 15 calculates the height change of the road surface at the first step determination position (Pa1) (a first height change) based on the distances and directions to the objects acquired by the arithmetic circuit 14 as illustrated in FIG. 4.

The process proceeds to step 11, where step determination position circuit 15 sets the second step determination position (Pa2), which is different from the first step determination position (Pa1), on the road surface around the vehicle as illustrated in FIGS. 2 and 3. Then, the process proceeds to step 13, where the step determination position circuit 15 calculates the height change of the road surface at the second step determination position (Pa2) (second height change) based on the distances and the directions to the objects acquired by the arithmetic circuit 14 as illustrated in FIG. 5.

The process proceeds to step 15, where the first comparator 19 compares the gradients of the height changes of the road surfaces at the first step determination position (Pa1) and the second step determination position (Pa2). Then, the process proceeds to step 17, where the step detection circuit 18 selects a step determination position (FIG. 5) at which the height change is large, in other words, at which the gradient of the height change of the road surface is steep, and detects the position of the step endpoint LD at the boundary between the road surface height changing portion (HC) and the roadway (Rr).

As described above, the first embodiment provides the following operation and effect.

Since errors are included in the distance and the direction to the road surface detected by the distance sensor 12, if the angle formed by the tangent of the step (LD) and the step determination position is small, the accuracy in detecting the position of the step (LD) decreases due to the influence of the errors. In light of this, the two step determination positions (Pa1, Pa2), of which the angles formed with the tangent of the step (LD) are different from each other, are set. Then, the step on the road surface is detected based on one of the first step determination position (Pa1) and the second step determination position (Pa2), the gradient of the height change of the road surface at which is larger than that of the other (FIG. 5). This reduces the influence of the errors included in the distance and the direction to the road surface detected by the distance sensor 12 and makes it possible to detect the position of the step (LD) on the road surface accurately. In particular, it is possible to detect the position of a step endpoint LD more accurately at a curve or an intersection where the angle formed by a step tangent direction and a step determination position is small.

Second Embodiment

Figure 7:
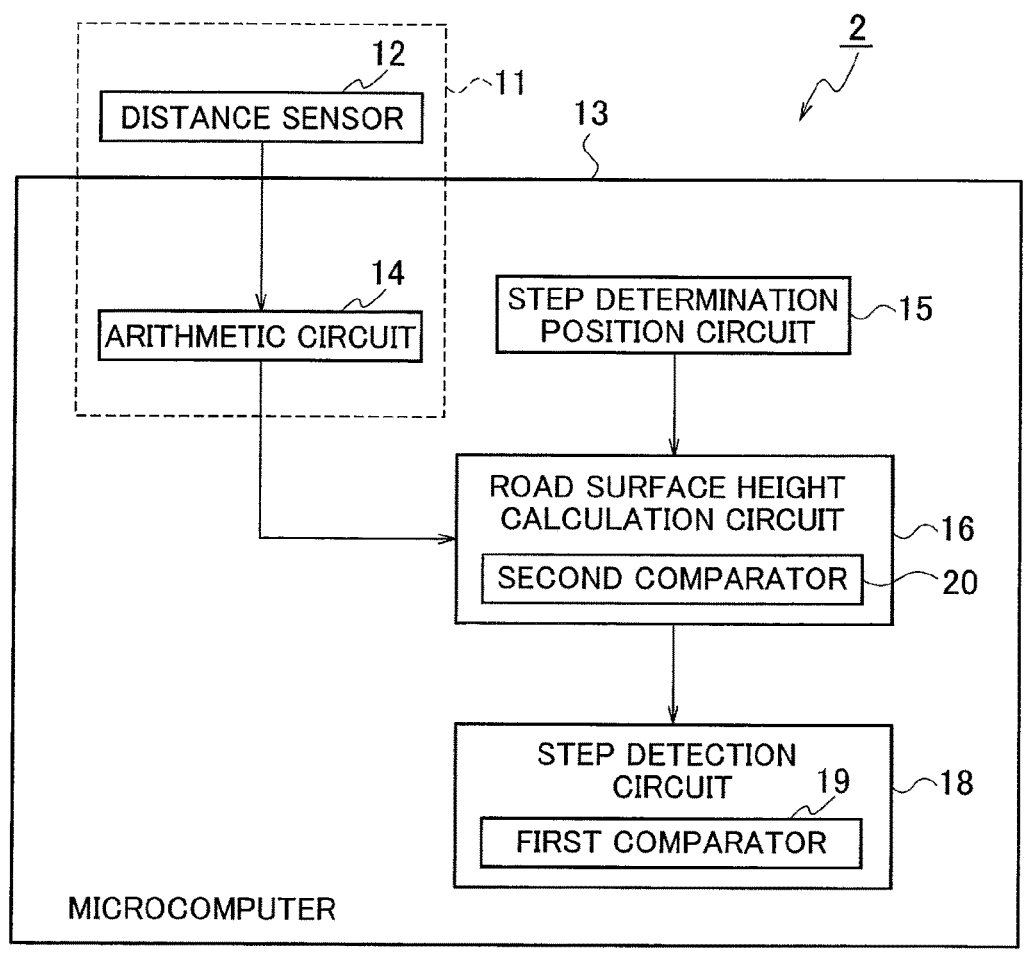
FIG. 7 is a block diagram illustrating the overall configuration of a step detection device 2 according to a second embodiment.

With reference to FIG. 7, descriptions will be provided for the overall configuration of a step detection device 2 according to a second embodiment. If the gradient of the height change of the road surface at the first step determination position ($Pa_1$) is larger than or equal to a threshold, the step detection device 2 detects the step (LD) on the road surface based on the height change of the road surface at the first step determination position ($Pa_1$). Further, in this case, to reduce the calculation load and improve the processing speed while keeping the step detection accuracy, the step detection device 2 does not set the second step determination position ($Pa_2$) and does not calculate the height change of the road surface at the second step determination position.

Specifically, the road surface height calculation circuit 16 includes a second comparator 20 for comparing the gradient of the height change of the road surface at the first step determination position (Pa1) with a threshold. The other configurations are the same as those in the step detection device 1 in FIG. 1, and descriptions thereof will be omitted.

The second comparator 20 compares a predetermined threshold and the gradient of the height change of the road surface at the first step determination position (Pa1). The method of the comparison is not particularly limited, but a known method may be used. For example, the second comparator 20 is capable of using the height change rate of the road surface at a step determination position for the comparison. The second comparator 20 may use the average value of the height change rate at the road surface height changing portion (HC) in FIG. 4 for the comparison, or may use the only height change rate in the vicinity of the step endpoint LD for the comparison. Note that the threshold can be set as appropriate in accordance with a detection accuracy required for the step detection device 2.

Figure 8:
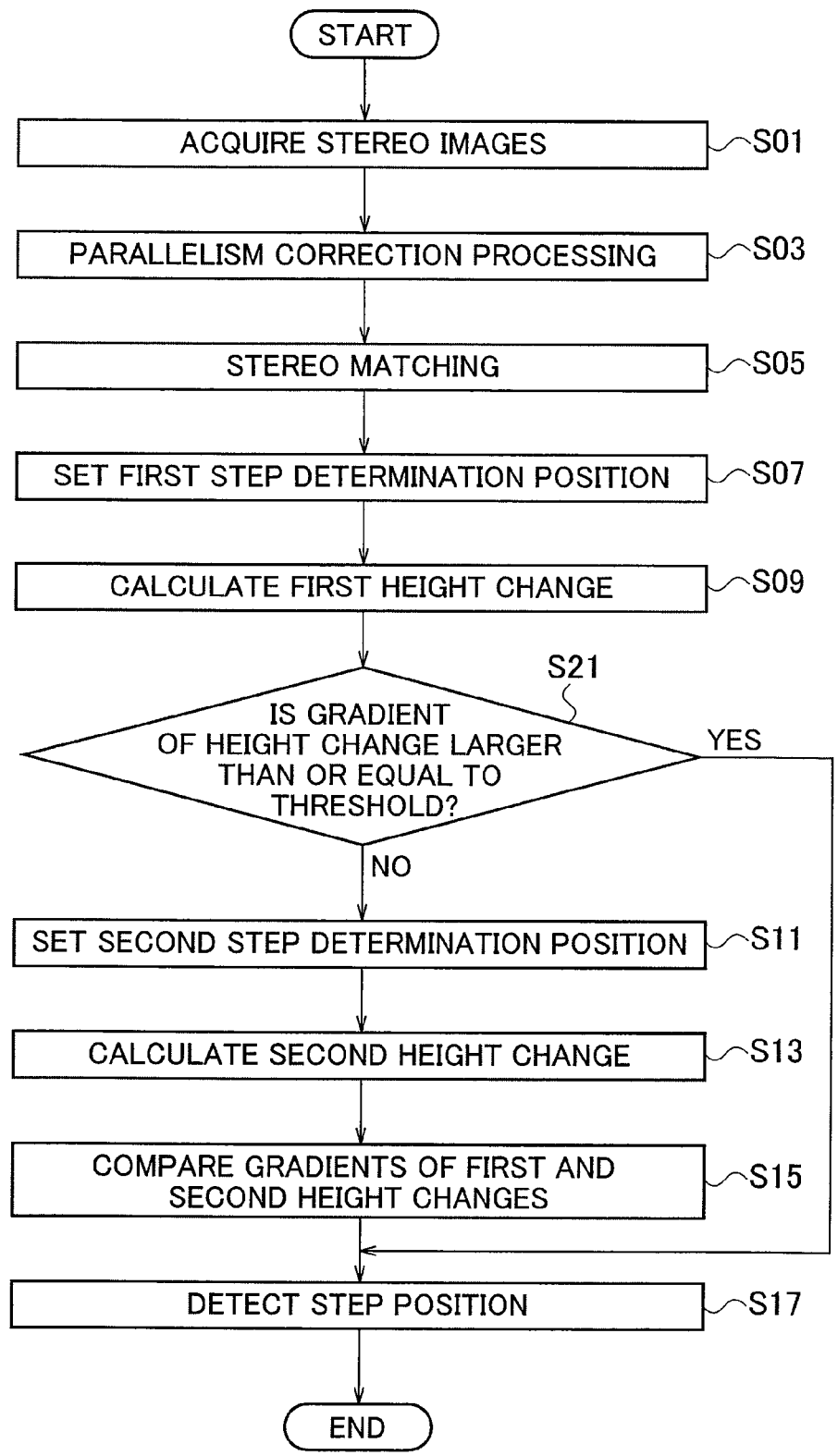
FIG. 8 is a flowchart illustrating an example of a step detection method using the step detection device 2 in FIG. 7.

With reference to FIG. 8, descriptions will be provided for an example of a step detection method using the step detection device 2 in FIG. 7. A series of processing operations illustrated in FIG. 8 is repeatedly executed in predetermined time cycles. FIG. 8 is different from FIG. 6 in that step S21 is executed between steps S09 and S11. Processing executed at steps S01 to S17 in FIG. 8 is the same as in steps S01 to S17 in FIG. 6, and descriptions thereof will be omitted.

At step S21, the second comparator 20 compares the gradient of the height change of the road surface at the first step determination position (Pa1) with the threshold. If the gradient of the height change of the road surface is larger than or equal to the threshold (YES at S21), it can be judged that the gradient of the height change of the road surface at the first step determination position (Pa1) is steep enough to satisfy the detection accuracy required for the step detection device 2. In this case, the process proceeds to step S17 without executing steps S11 to S15. In step S17, the step detection circuit 18 detects a step on the road surface based on the height change of the road surface at the first step determination position (Pa1).

On the other hand, if the gradient of the height change of the road surface is smaller than the threshold (NO at step S21), it can be judged that the gradient of the height change of the road surface at the first step determination position (Pa1) is not steep enough to satisfy the detection accuracy required for the step detection device 2. Hence, to satisfy the position detection accuracy, step S11 to S15 are executed in the same way as in the first embodiment before the process proceeds to step S17. At step S17, the step detection circuit 18 detects a step on the road surface based on a step determination position, the gradient of the height change of the road surface at which is larger.

As described above, the second embodiment provides the following operation and effect.

If the gradient of the height change of the road surface at the first step determination position (Pa1) is larger than or equal to the threshold, the step on the road surface is detected based on the height change of the road surface at the first step determination position (Pa1). This reduces the influence of errors included in the distance and the direction to the road surface detected by the distance sensor 12 and makes it possible to detect the position of the step on the road surface accurately. In particular, it is possible to detect the position of the step endpoint LD more accurately at a curve or an intersection where the angle formed by a step tangent direction and a step determination position is small. In addition, the step determination position circuit 15 does not set the second step determination position (Pa2), and the road surface height calculation circuit 16 does not calculate the height change of the road surface at the second step determination position (Pa2). Thus, it is possible to reduce the calculation load and improve the processing speed while keeping the step detection accuracy.

Note that in the example illustrated in the second embodiment, if the gradient of the height change of the road surface is smaller than the threshold (NO at S21), the same processing as in the first embodiment is executed. However, the embodiment is not limited to this, but various modifications can be made. For example, if the gradient of the height change of the road surface is smaller than the threshold (NO at S21), the step detection device 2 can terminate this processing operation cycle without executing steps S11 to S17 and start the next processing cycle. Then, at step S07 in the next processing cycle, the step determination position circuit 15 can set a first predetermined direction and first predetermined distance which are different from the previous first predetermined direction and first predetermined distance. With this modification, too, it is possible to reduce the calculation load and improve the processing speed while keeping the step detection accuracy. In the example of the second embodiment, if the gradient of the height change of the road surface at the first step determination position (Pa1) is larger than or equal to the threshold, the step of the road surface is detected based on the height change of the road surface at the first step determination position (Pa1), and the height change of the road surface at the second step determination position (Pa2) is not calculated. Other than this, it is possible to further set multiple step determination positions and repeat determination processing in order from the first step determination position (Pa1) to a step determination position which enables the gradient of the height change of the road surface to be larger than or equal to the threshold. If the step determination position which enables the gradient of the height change of the road surface to be larger than or equal to the threshold is found, it is possible to detect a step on the road surface based on the height change of the road surface with the step determination position which enabled the gradient of the height change of the road surface to be larger than or equal to the threshold, without executing the next determination processing.

Third Embodiment

If the intersection point of the first step determination position (Pa$_1$) and the step (LD) and the intersection point of the second step determination position (Pa$_2$) and the step (LD) are away from each other, it is difficult in some cases to compare the difference between the gradients of the height changes of the road surfaces properly.

In view of the above, in examples described in third to sixth embodiments, a step existing area where a step exists at a first step determination position (Pa1) is estimated, and then a second step determination position (Pa2) passing through the step existing area is set. Specifically, step detection devices (3 to 6) each further include a step existing area estimation circuit (21 to 24) for estimating the step existing area where a step exists at the first step determination position (Pa1). The step determination position circuit 15 sets a second predetermined direction and a second predetermined distance such that the second step determination position (Pa2) passes through the step existing area. This makes it possible to bring the step detected at the first step determination position (Pa1) closer to the step detected at the second step determination position (Pa2).

Figure 9:
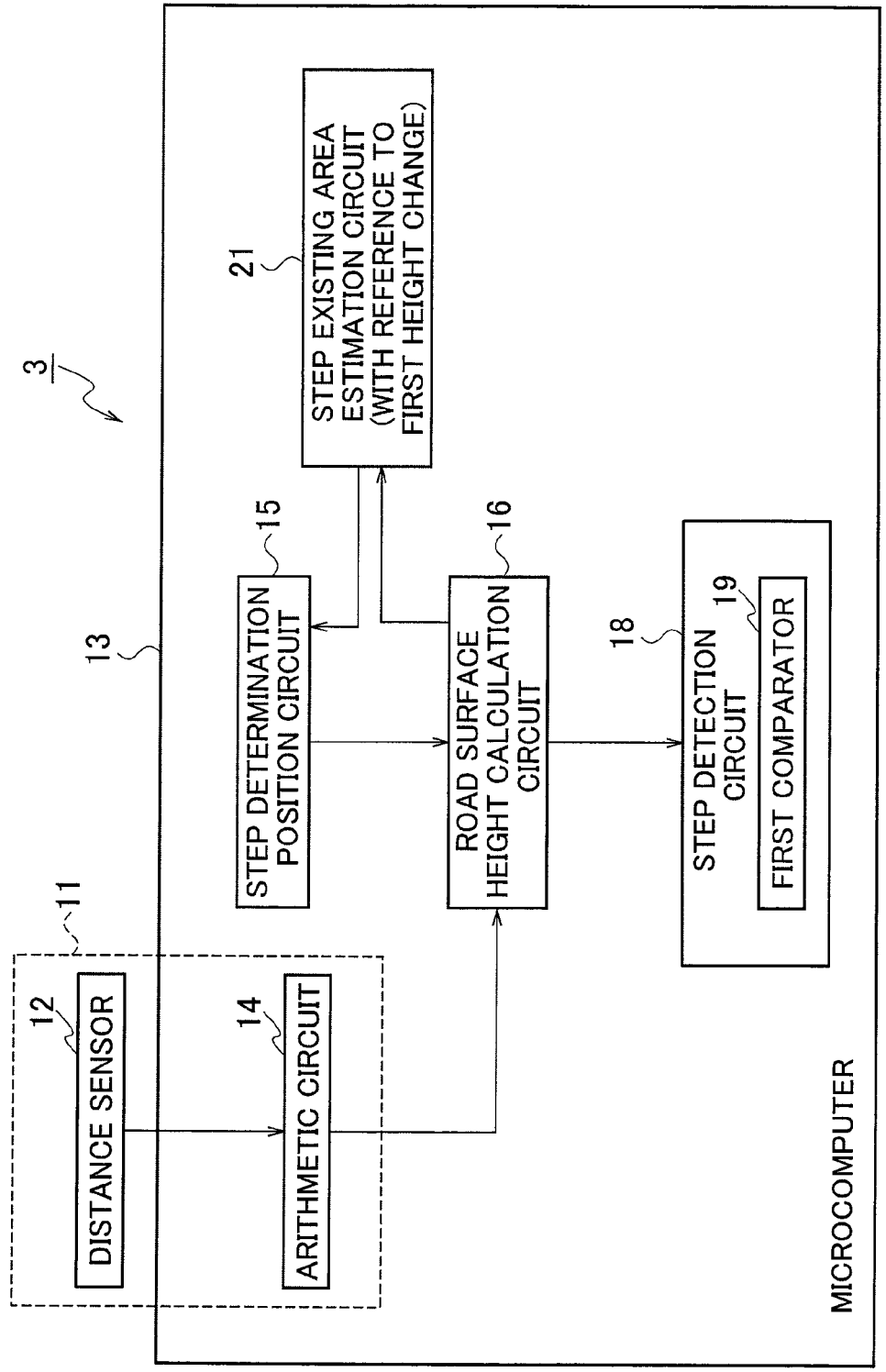
FIG. 9 is a block diagram illustrating the overall configuration of a step detection device 3 according to a third embodiment.

As illustrated in FIG. 9, the step detection device 3 according to the third embodiment includes the step existing area estimation circuit 21 for estimating a step existing area Q1 based on the height change of the road surface at the first step determination position (Pa1). Other configurations are the same as those in the step detection device 1 in FIG. 1. Note that although descriptions will be provided here for the third embodiment based on the step detection device 1 in FIG. 1, the third embodiment is applicable to the step detection device 2 in FIG. 7.

Figure 10:
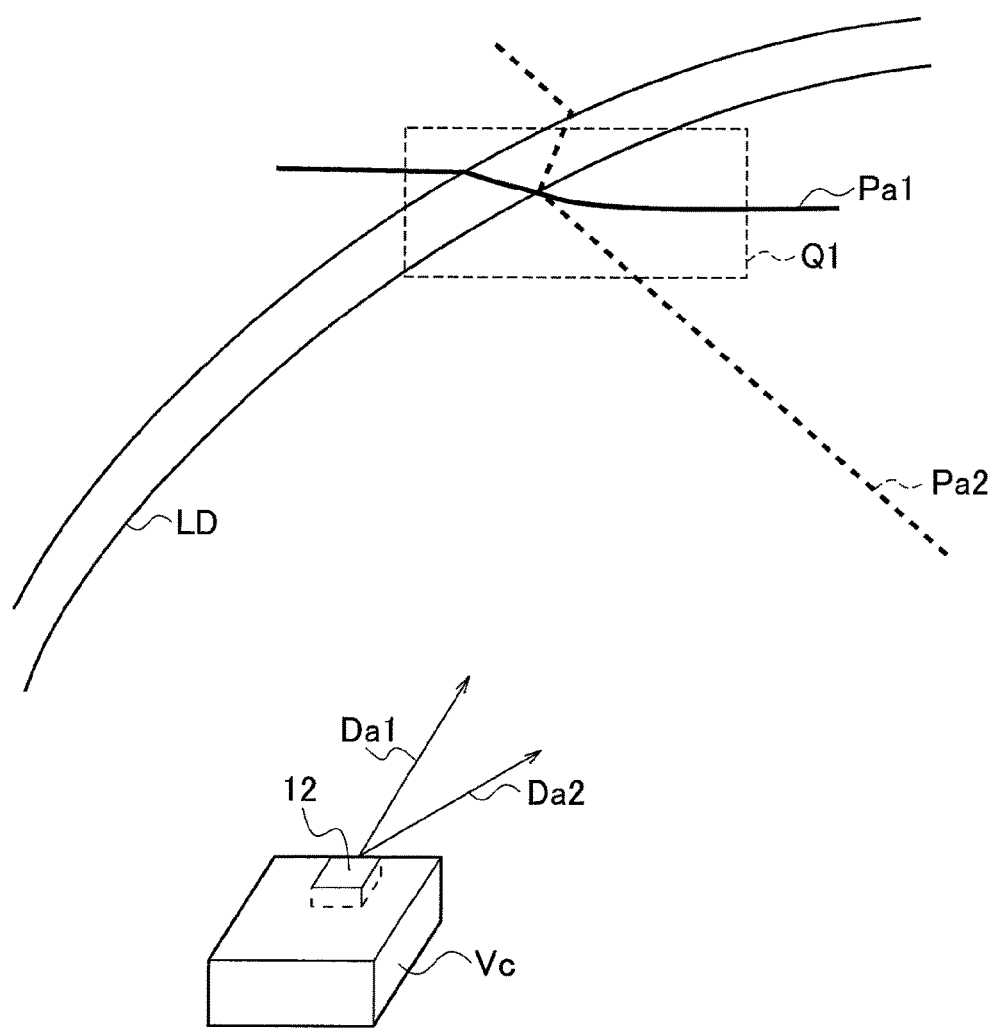
FIG. 10 is a perspective view illustrating an example of the linear step determination positions ($Pa_1$, $Pa_2$) and a step existing area $Q_1$ which are set on the road surface around the vehicle (Vc)
Figure 11:
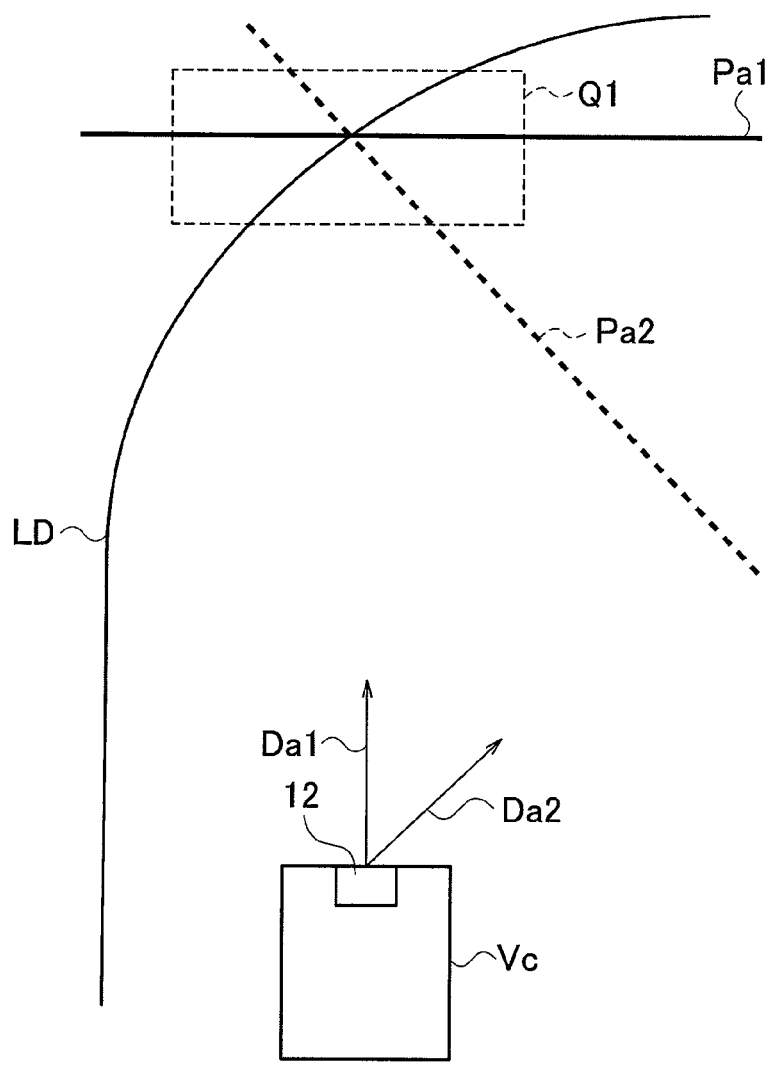
FIG. 11 is an overhead view corresponding to FIG. 10.

As illustrated in FIGS. 10 and 11, the step existing area estimation circuit 21 specifies an area including the road surface height changing portion (HC) and the step endpoint LD from the height change of the road surface at the first step determination position (Pa1) (FIG. 4) and sets the area as the step existing area Q1. The step determination position circuit 15 sets the second predetermined direction and the second predetermined distance such that the second step determination position (Pa2) passes through the step existing area Q1.

The depth range of the step existing area Q1 can be, for example, the length of one curbstone. Search within the length of one curbstone makes it possible to set the second step determination position within a range in which the inclination of the curb does not change.

The horizontal range of the step existing area Q1 can be changed in accordance with the amount of the height change. There is a standard of a one-piece block in which the gradient is set in a range of about 35 to 45 cm from the vicinity of the step because of drainage or the like, for a low curbstone block (symbol B1 in FIG. 25A) used in the road environment in Japan. Based on the standard for the one-piece block, the horizontal range can be set to about 50 cm considering the difference between the height changing position (TD) and the true step endpoint LD. Here, in a country other than Japan, the horizontal range may be set to a predetermined distance based on standards or the like in the country.

In addition, a high curbstone block (symbol B2 in FIG. 25B) for defining a boundary between a sidewalk and a roadway includes a curbstone alone without including a gradient portion on the roadway side. Accordingly, a gradient portion around the step is made by the transverse gradient of the roadway. This means that the gradient is set in the distance from the entire roadway to the endpoint of the curb. In the road environment in Japan, even if the predetermined distance in the vehicle width direction is set to about 50 cm for a low curbstone block, the angle of the gradient does not change. Thus, it is possible to detect the position of the step endpoint LD correctly. Here, since the entire roadway has a constant gradient, the accuracy will be better when the entire roadway is included in the predetermined distance. This is because that the S/N ratio of distance measurement data is improved against noises. In light of this, the horizontal range can be changed in accordance with the height change which means the height of a curbstone block. This allows for extraction in a necessary and minimum range which has a constant gradient and makes it possible to estimate the road surface gradient more accurately. Consequently, the position of the step endpoint LD can be detected more accurately.

Figure 12:
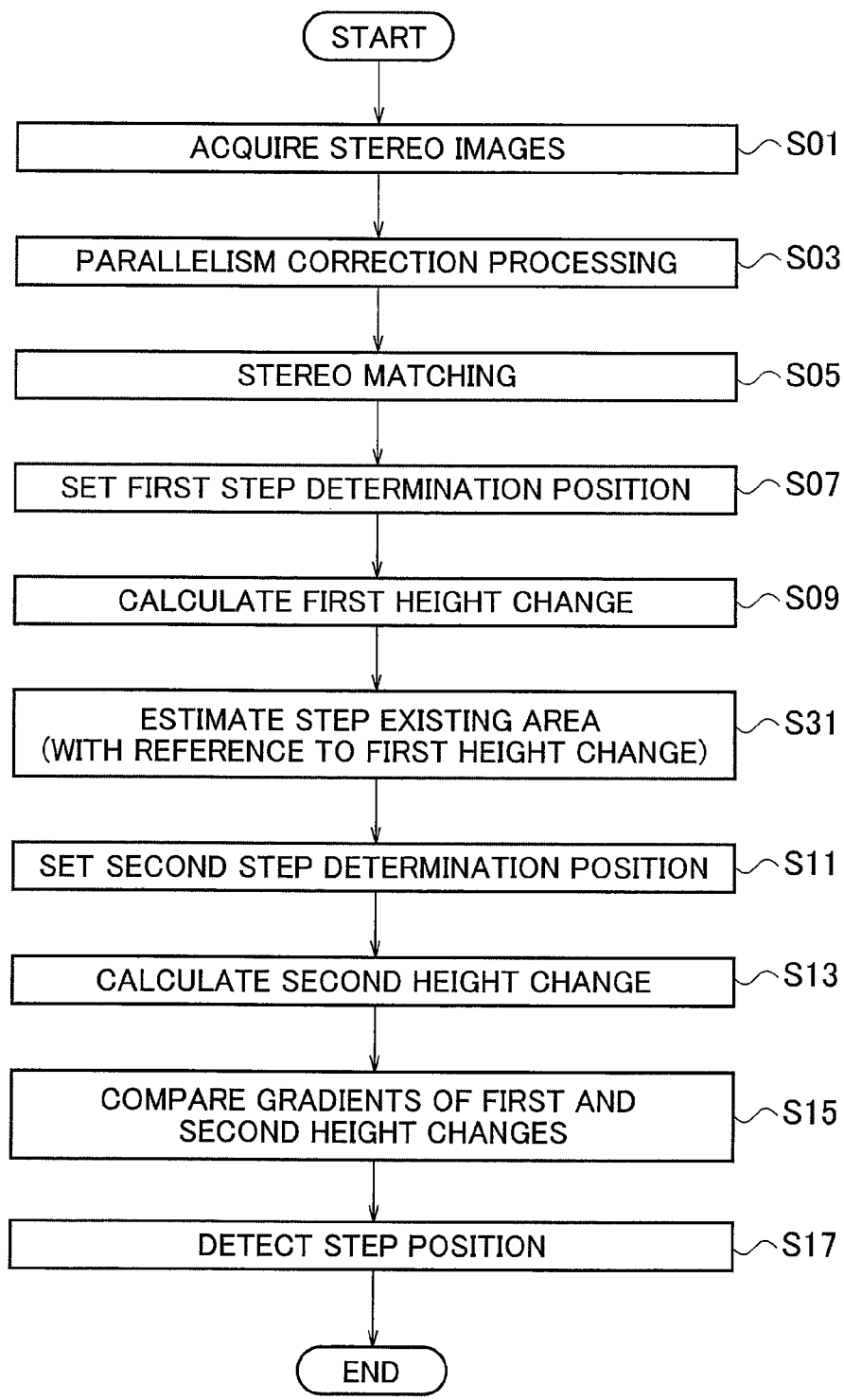
FIG. 12 is a flowchart illustrating an example of a step detection method using the step detection device 3 in FIG. 9.

An example of a step detection method using the step detection device 3 in FIG. 9 will be described with reference to FIG. 12. A series of processing operations illustrated in FIG. 12 is repeatedly executed in predetermined time cycles. FIG. 12 is different from FIG. 6 in that step S31 is executed between steps S09 and S11. The processing executed at steps S01 to S17 in FIG. 12 is the same as in steps S01 to S17 in FIG. 6, and descriptions thereof will be omitted.

At step S31, the step existing area estimation circuit 21 estimate the step existing area Q1, in which the step (LD) exists, from the height change of the road surface at the first step determination position (Pa1) (FIG. 4). Then, the process proceeds to step 11, where the step determination position circuit 15 adjusts the second predetermined direction and the second predetermined distance to set the second step determination position (Pa2) which passes through the step existing area Q1.

As described above, the third embodiment provides the following operation and effect.

The step existing area Q1 where a step exists at the first step determination position (Pa1) is estimated, and the second step determination position (Pa2) passing through the step existing area Q1 is set. This makes it possible to bring the step detected at the first step determination position (Pa1) closer to the step detected at the second step determination position (Pa2). Accordingly, it is possible to compare the gradients of the height changes of the road surfaces at almost the same step position. This allows for a more suitable angle setting of the predetermined direction relative to the step (LD), which in turn allows for a more accurate detection of the position of the step (LD).

Since the step existing area Q1 is estimated based on the height change of the road surface at the first step determination position (Pa1) step, it is possible to estimate the step existing area Q1 more accurately. As a result, it is possible to bring the step at the first step determination position (Pa1) closer to the step at the second step determination position (Pa2). Accordingly, it is possible to compare the gradients of the height changes of the road surfaces at almost the same step position. This allows for a more suitable angle setting of the predetermined direction relative to the step (LD), which in turn allows for a more accurate detection of the position of the step (LD).

Fourth Embodiment

The step detection device 4 according to the fourth embodiment repeatedly executes a series of step detection processes in predetermined time cycles and estimates a step existing area $Q_2$ based on the step position detected in the previous processing cycle.

Figure 13:
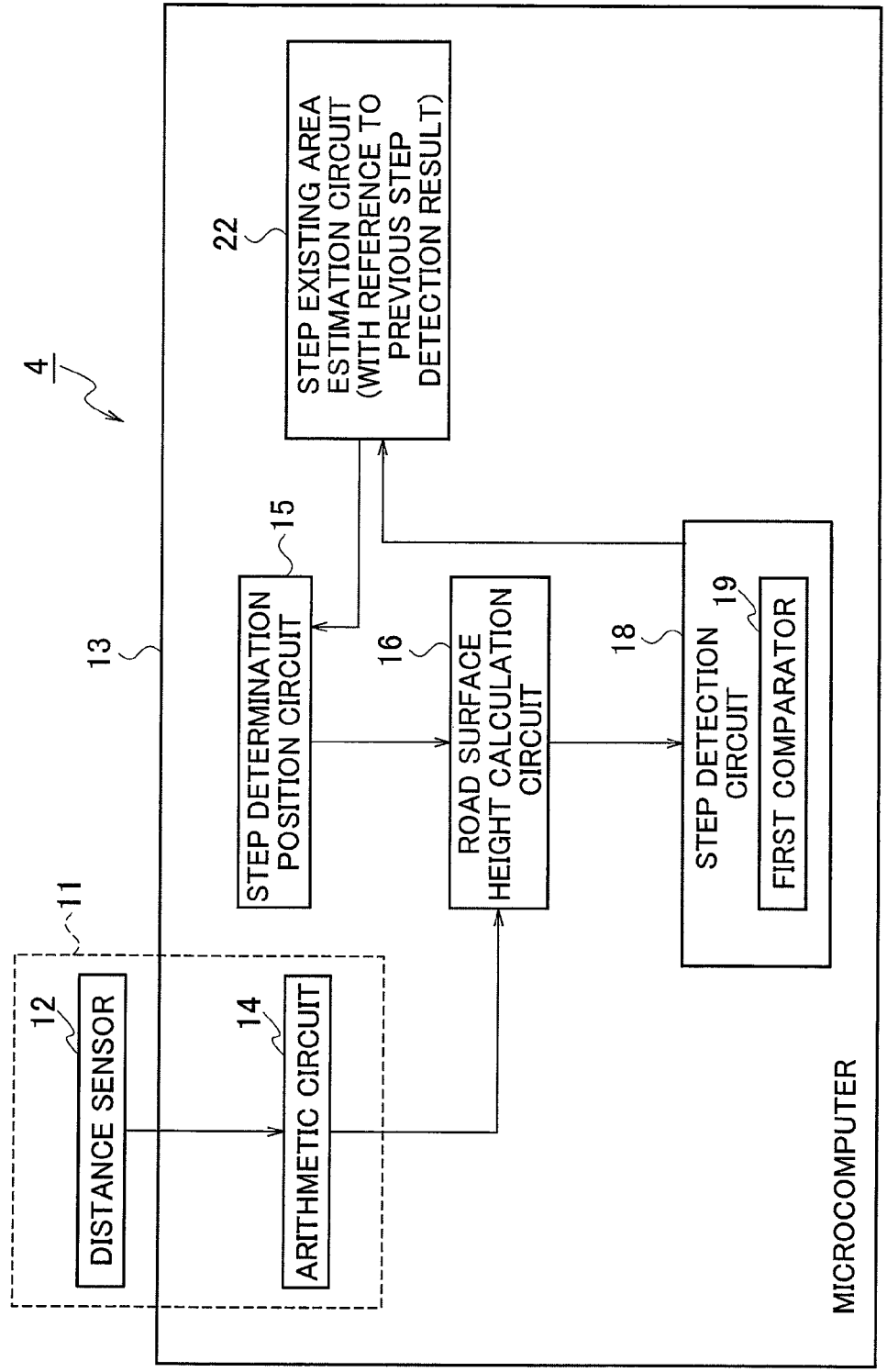
FIG. 13 is a block diagram illustrating the overall configuration of a step detection device 4 according to a fourth embodiment.

As illustrated in FIG. 13, the step detection device 4 according to the fourth embodiment includes the step existing area estimation circuit 22 for estimating the step existing area $Q_2$ based on the position of the step (LD) which was previously detected. The other configurations are the same as those in the step detection device 1 in FIG. 1. Note that although descriptions will be provided here for the fourth embodiment based on the step detection device 1 in FIG. 1, the fourth embodiment is applicable to the step detection device 2 in FIG. 7.

Figure 14:
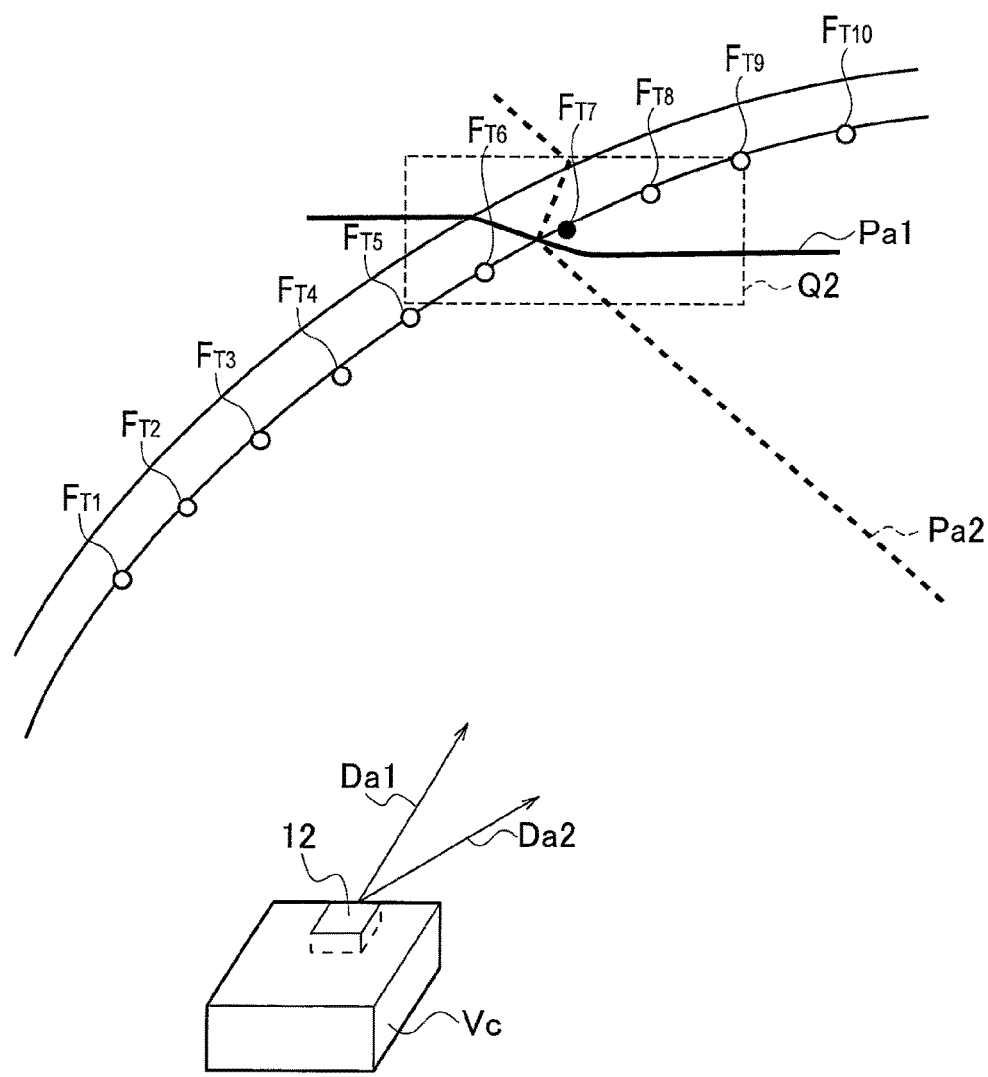
FIG. 14 is a perspective view illustrating operation of a step existing area estimation circuit 22 according to the fourth embodiment.

Specifically, the step existing area estimation circuit 22 estimates the movement amount of the vehicle Vc in predetermined time cycles. The step existing area estimation circuit 22 estimates a position or an area where the step (LD) is expected to be detected this time, using the estimated movement amount and positional information on the previously detected step endpoint LD. In other words, the step existing area estimation circuit 22 estimates the step existing area Q2 from the position of the step endpoint LD which was detected at a different time. For example, as illustrated in FIG. 14, the previously detected position of the step endpoint LD is corrected by the movement amount of the vehicle. Of the corrected positions (FT1, FT2, FT3, . . . , FT10), the step existing area Q2 is set in an area including the position (FT7) which is closest to the first step determination position (Pa1). The step existing area Q2 is set in an area in which the closest position (FT7) is centered. Alternatively, the step existing area Q2 may be set in an area in which an intersection point of a line connecting the corrected positions (FT1, FT2, FT3, . . . , FT10) and the first step determination position (Pa1) is centered. The step determination position circuit 15 adjusts the second predetermined direction and the second predetermined distance to set the second step determination position (Pa2) which passes through the step existing area Q2.

Figure 15:
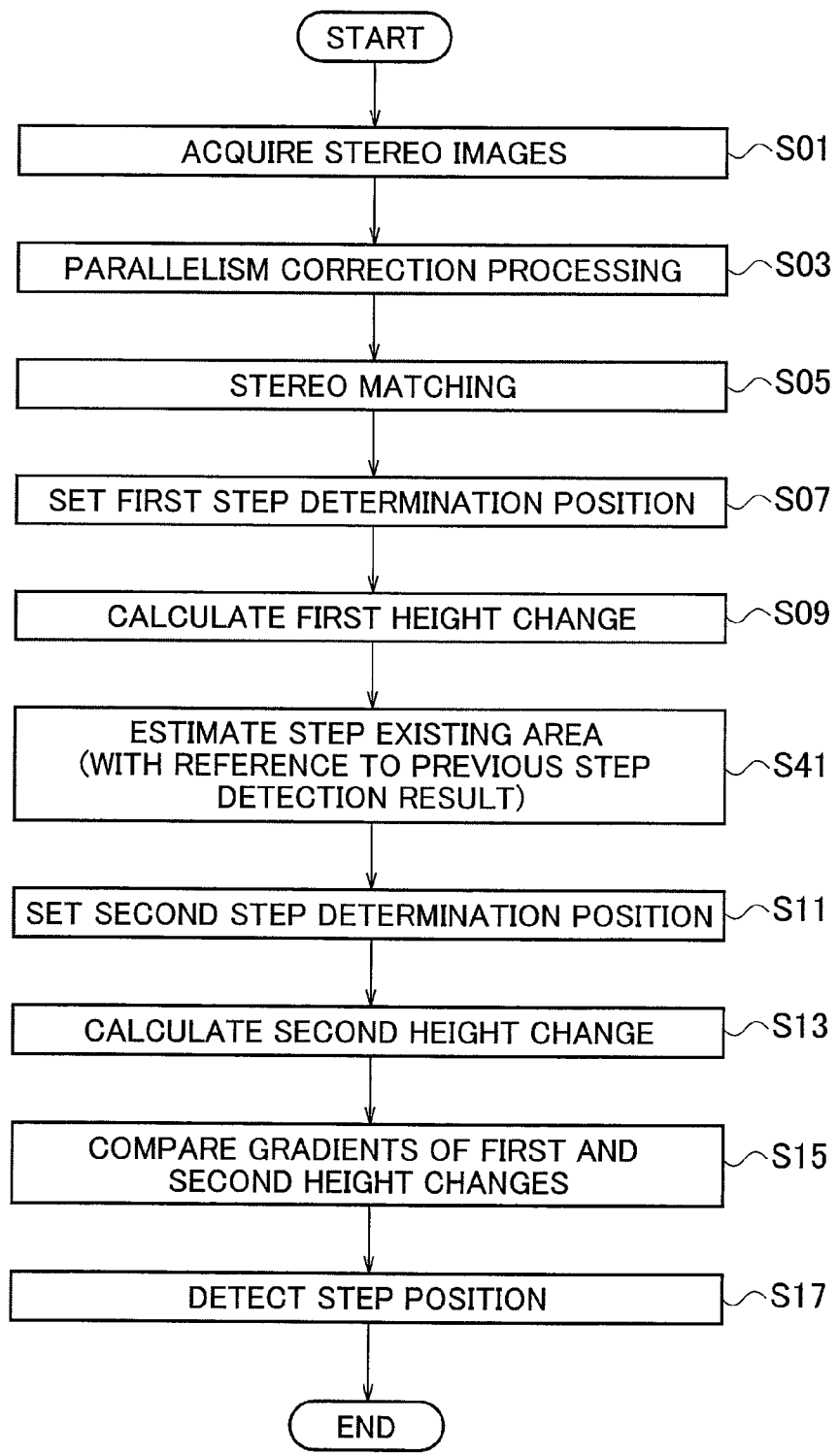
FIG. 15 is a flowchart illustrating an example of a step detection method using the step detection device 4 in FIG. 13.

An example of a step detection method using the step detection device 4 in FIG. 13 will be described with reference to FIG. 15. A series of processing operations illustrated in FIG. 15 is repeatedly executed in predetermined time cycles. FIG. 15 is different from FIG. 6 in that step S41 is executed between steps S09 and S11. The processing executed at steps S01 to S17 in FIG. 15 is the same as in steps S01 to S17 in FIG. 6, and descriptions thereof will be omitted.

At step S41, the step existing area estimation circuit 22 estimates the movement amount of the vehicle Vc in predetermined time cycles. Then, the step existing area estimation circuit 22 estimates the step existing area Q2, using the movement amount and positional information on the previously detected step endpoint LD. Then, the process proceeds to step 11, where the step determination position circuit 15 adjusts the second predetermined direction and the second predetermined distance to set the second step determination position (Pa2) which passes through the step existing area Q2.

As described above, the fourth embodiment provides the following operation and effect.

Since the step existing area is estimated based on the previously detected step position, it is possible to estimate the step existing area Q2 more accurately. As a result, it is possible to bring the step at the first step determination position (Pa1) closer to the step at the second step determination position (Pa2). Accordingly, it is possible to compare the gradients of the height changes of the road surfaces at almost the same step position. This allows for a more suitable angle setting of the predetermined direction relative to the step (LD), which in turn allows for a more accurate detection of the position of the step (LD).

Fifth Embodiment

The step detection device 5 according to the fifth embodiment sets multiple first step determination positions ($Pa_1$) in one processing cycle and tries to detect a step on the road surface for every first step determination position ($Pa_1$). Then, a step existing area $Q_3$ is estimated based on a step position which was successfully detected.

Figure 16:
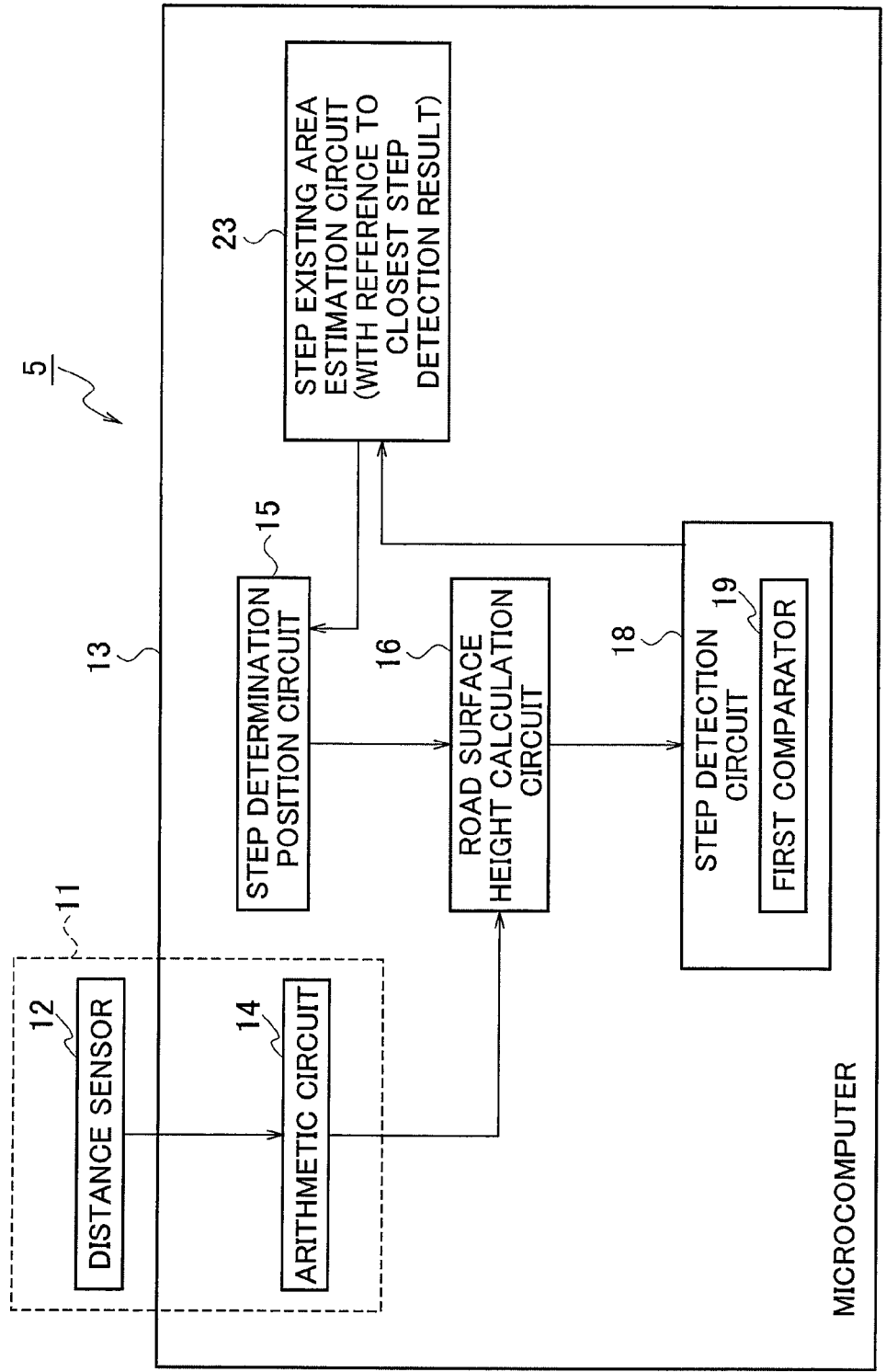
FIG. 16 is a block diagram illustrating the overall configuration of a step detection device 5 according to a fifth embodiment.

As illustrated in FIG. 16, the step detection device 5 according to the fifth embodiment includes the step existing area estimation circuit 23. The step determination position circuit 15 sets multiple first step determination positions (Pa1) in one processing cycle. The step detection circuit 18 tries to detect a step on the road surface for every first step determination position (Pa1), and the step existing area estimation circuit 23 estimates a step existing area Q3 based on the step (LD) which was successfully detected. The other configurations are the same as those in the step detection device 1 in FIG. 1. Note that although descriptions will be provided here for the fifth embodiment based on the step detection device 1 in FIG. 1, the fifth embodiment is applicable to the step detection device 2 in FIG. 7.

Figure 17:
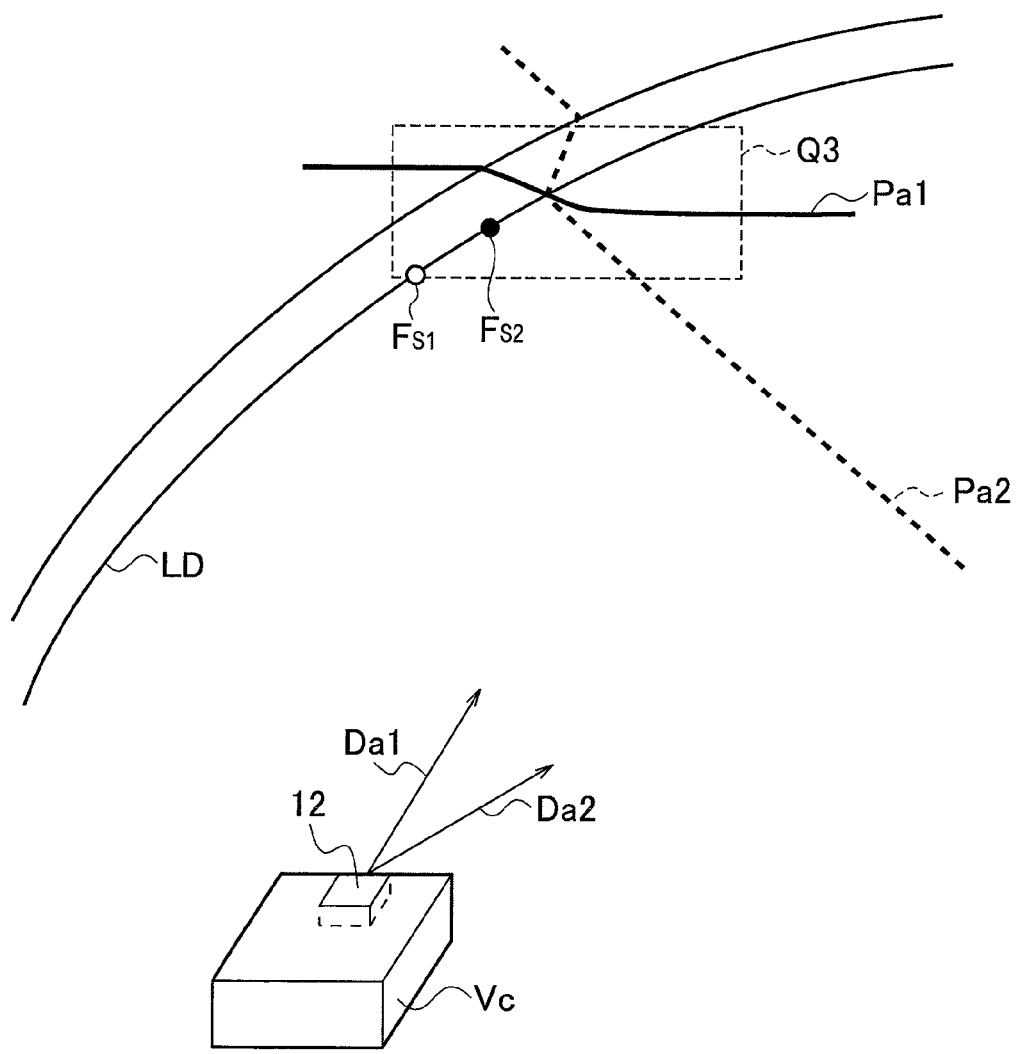
FIG. 17 is a perspective view illustrating operation of a step existing area estimation circuit 23 according to the fifth embodiment.

Specifically, as illustrated in FIG. 17, the step detection circuit 18 tries to detect a step on the road surface sequentially from a first step determination position (Pa1) closer to the distance sensor 12 in one processing cycle. Then, of the step positions (FS1, FS2) at which the detection was succeeded, the step existing area estimation circuit 23 selects the step position (FS2) closest to the first step determination position (Pa1) at which the detection was failed. Then, the step existing area estimation circuit 23 estimates the step existing area Q3 at the first step determination position (Pa1) at which the detection was failed, based on the selected step position (FS2). The step determination position circuit 15 adjusts the second predetermined direction and the second predetermined distance to set the second step determination position (Pa2) which passes through the step existing area Q3.

Note that it is also possible to try to detect a step on the road surface sequentially from a first step determination position (Pa1) farthest from the distance sensor 12. Alternatively, the step existing area Q3 may be estimated using not only the closest step position but also additionally using the second closest position (Fs1) and the third closest step position and so on.

Figure 18:
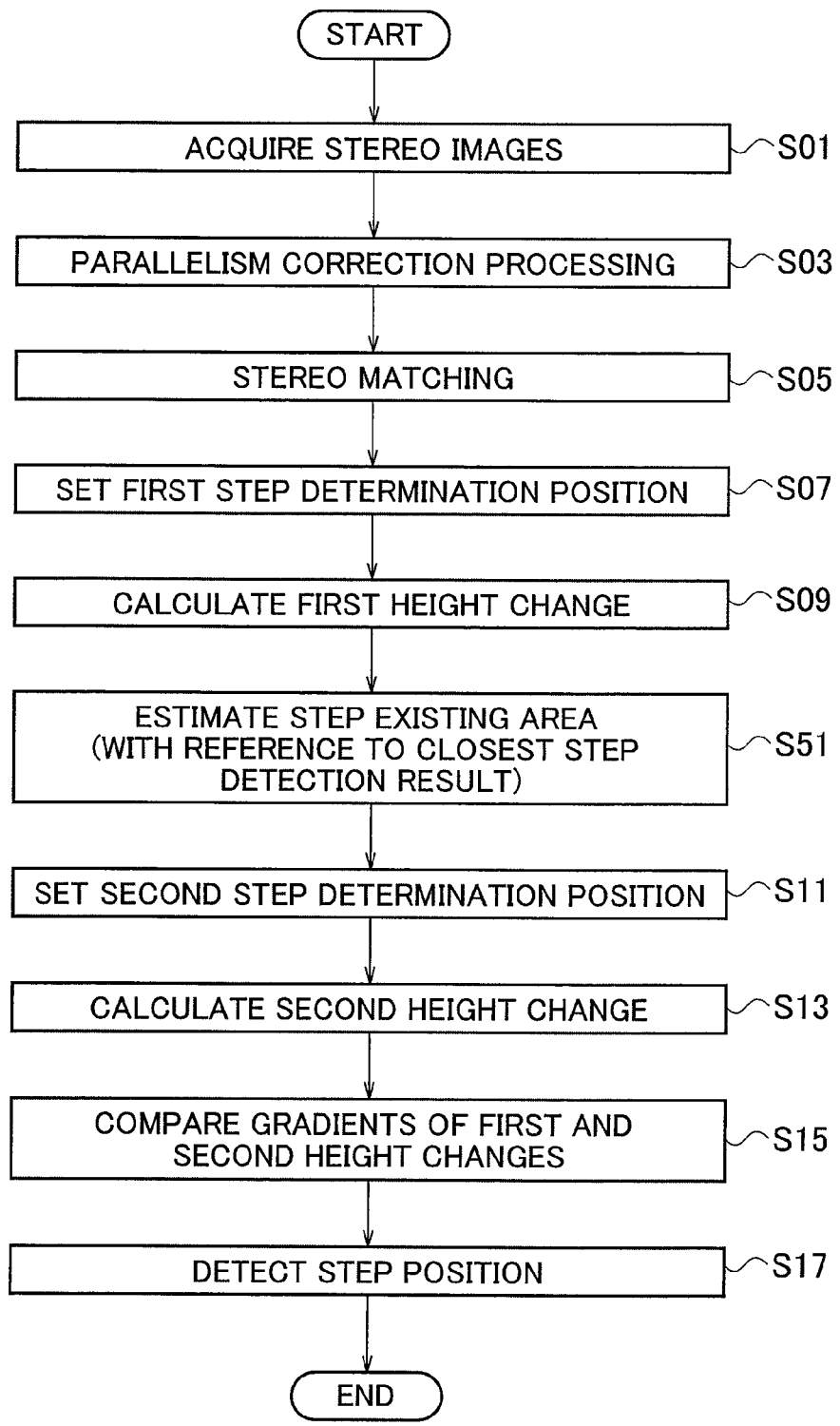
FIG. 18 is a flowchart illustrating an example of a step detection method using the step detection device 5 in FIG. 16.

An example of a step detection method using the step detection device 5 in FIG. 16 will be described with reference to FIG. 18. A series of processing operations illustrated in FIG. 18 is repeatedly executed in predetermined time cycles. FIG. 18 is different from FIG. 6 in that step S51 is executed between steps S09 and S11. In addition, processing contents at steps S07 and S09 are different from those in FIG. 6. Processing executed at the other steps are the same as in FIG. 6, and descriptions thereof will be omitted.

At step S07, the step determination position circuit 15 sets multiple first step determination positions (Pa1) on the road surface around the vehicle. At this time, the step determination position circuit 15 simultaneously sets the multiple first step determination positions (Pa1), not changing the first predetermined direction but changing the first predetermined distance.

The process proceeds to step 09, where the step determination position circuit 15 calculate the height change (first height change) of the road surface at every first step determination position (Pa1) based on the distances and the directions to objects acquired by the arithmetic circuit 14. Further, the step detection circuit 18 tries to detect a step for every first step determination position (Pa1).

The process proceeds to step 51, where the step existing area estimation circuit 23 selects the step position (FS2) closest to the first step determination position (Pa1) out of the step positions (FS1, FS2) which were successfully detected. Then, the step existing area estimation circuit 23 estimates the step existing area Q3 at the first step determination position (Pa1) based on the selected step position (FS2).

The process proceeds to step 11, where the step determination position circuit 15 adjusts the second predetermined direction and the second predetermined distance to set the second step determination position (Pa2) which passes through the step existing area Q3.

As described above, the fifth embodiment provides the following operation and effect.

The multiple first step determination positions (Pa1) are set, and the detection of a step on the road surface is attempted for every first step determination position (Pa1). The step existing area Q3 is estimated based on the step positions (FS1, FS2) which were successfully detected. This allows for more accurate estimation of the step existing area. As a result, it is possible to bring the step at the first step determination position (Pa1) closer to the step at the second step determination position (Pa2). Accordingly, it is possible to compare the gradients of the height changes of the road surfaces at almost the same position of the step. This allows for a more suitable angle setting of the predetermined direction relative to the step (LD), which in turn allows for a more accurate detection of the position of the step (LD).

Sixth Embodiment

The step detection device 6 according to the sixth embodiment estimates the position of the vehicle Vc on the map and estimates a step existing area based on the estimated position of the vehicle Vc on the map.

Figure 19:
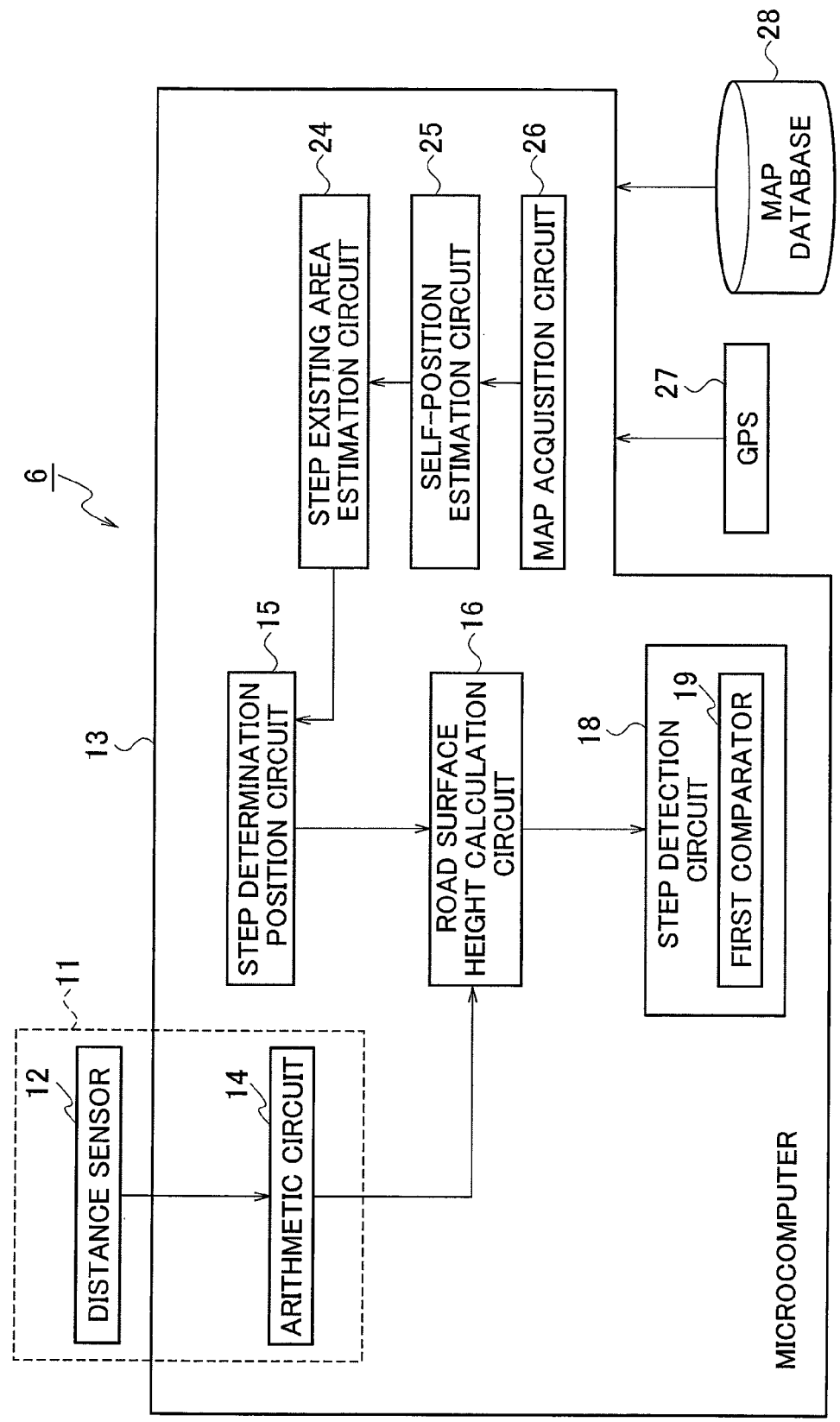
FIG. 19 is a block diagram illustrating the overall configuration of a step detection device 6 according to a sixth embodiment.

As illustrated in FIG. 19, the step detection device 6 according to the sixth embodiment further includes a map acquisition circuit 26 for acquiring map information on the surroundings of the vehicle and a self-position estimation circuit 25 for estimating the position of the vehicle Vc on the map. The step existing area estimation circuit 24 estimates a step existing area based on the estimated position of the vehicle on the map. Note that the step detection device 6 may further include a GPS 27 and a map database 28. Alternatively, the step detection device 6 may acquire map information on the surroundings of the vehicle Vc and information on the self-position by means of communication with the outside. The other configurations are the same as those in the step detection device 1 in FIG. 1. Note that although descriptions will be provided here for the sixth embodiment based on the step detection device 1 in FIG. 1, the sixth embodiment is applicable to the step detection device 2 in FIG. 7.

The map information acquired by the map acquisition circuit 26 includes road information indicating the shape of the roadway. The shape of the roadway is the shape defined by the step (LD). The self-position estimation circuit 25 estimates the position of the vehicle Vc on the map from self-position information acquired from the GPS 27 indicating the current position of the vehicle Vc. This allows for estimation of the planar shape of the step (LD) relative to the vehicle Vc. The step existing area estimation circuit 24 estimates a step existing area based on the estimated position of the vehicle Vc on the map and the first step determination position (Pa1). Specifically, the step existing area estimation circuit 24 estimates the step existing area in which an intersection position of the outline of the roadway relative to the vehicle Vc and the first step determination position (Pa1) is centered.

Figure 20:
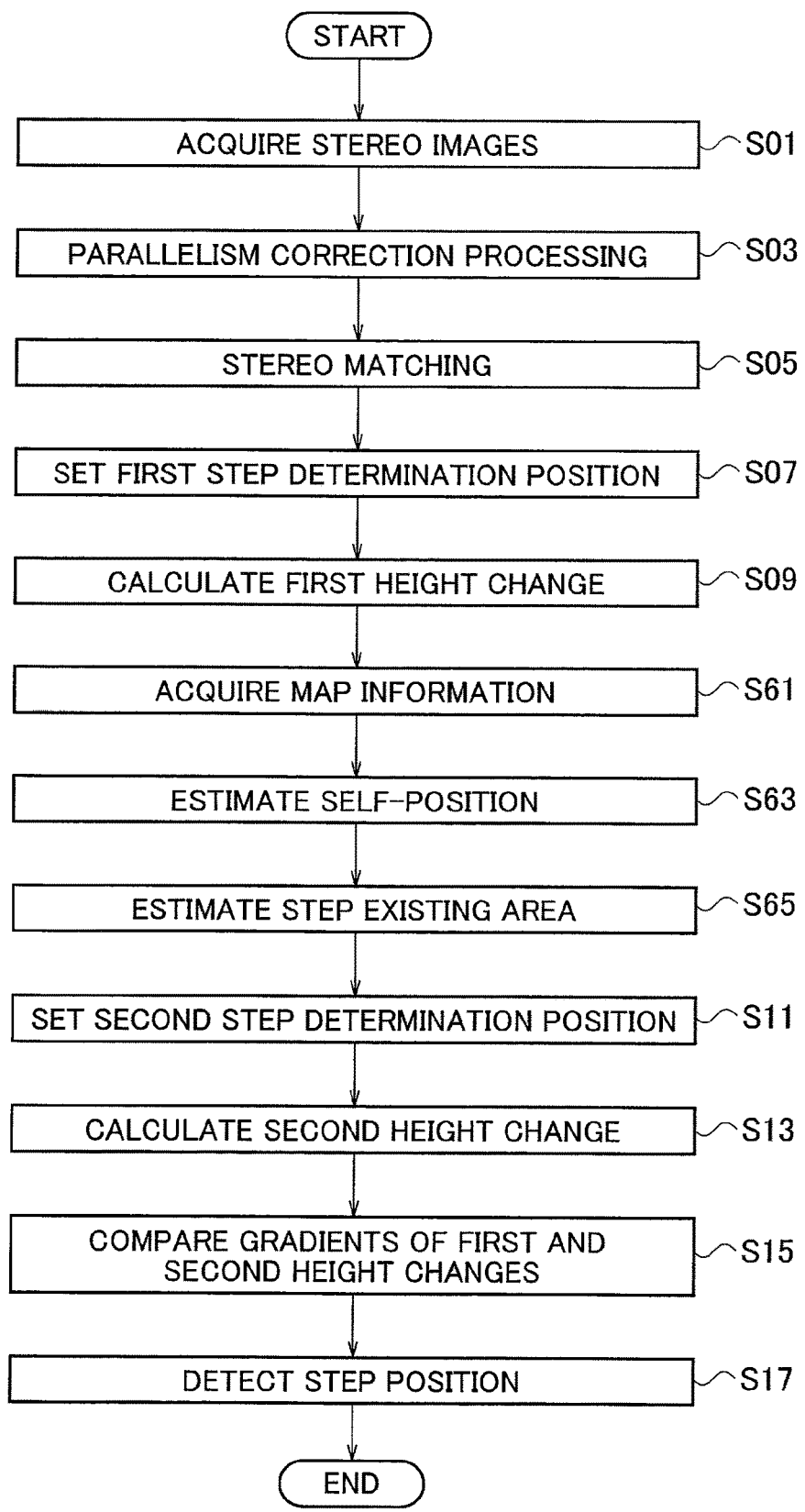
FIG. 20 is a flowchart illustrating an example of a step detection method using the step detection device 6 in FIG. 19.

An example of a step detection method using the step detection device 6 in FIG. 19 will be described with reference to FIG. 20. A series of processing operations illustrated in FIG. 20 is repeatedly executed in predetermined time cycles. FIG. 20 is different from FIG. 6 in that steps S61 to S65 are executed between steps S09 and S11. The processing executed at steps S01 to S17 in FIG. 20 is the same as in steps S01 to S17 in FIG. 6, and descriptions thereof will be omitted.

At step S61, the map acquisition circuit 26 acquires the map information including the road information indicating the shape of the roadway. The process proceeds to step 63, where the self-position estimation circuit 25 estimates the position of the vehicle Vc on the map from the self-position information acquired from the GPS 27 indicating the current position of the vehicle Vc. The process proceeds to step 65, where the step existing area estimation circuit 24 estimates a step existing area based on the estimated position of the vehicle Vc on the map and the first step determination position (Pa1).

The process proceeds to step 11, where the step determination position circuit 15 adjusts the second predetermined direction and the second predetermined distance to set the second step determination position (Pa2) which passes through the step existing area Q2.

As described above, the sixth embodiment provides the following operation and effect.

Since the step existing area is estimated based on the position of the vehicle on the map, it is possible to estimates the step existing area more accurately. As a result, it is possible to bring the step at the first step determination position closer to the step at the second step determination position. Accordingly, it is possible to compare the gradients of the height changes of the road surfaces at almost the same position of the step. This allows for a more suitable angle setting of the predetermined direction relative to the step, which in turn allows for a more accurate detection of the position of the step.

Although the embodiments according to the present invention have been described as above, it should not be understood that the descriptions and the drawings constituting part of this disclosure limit the present invention. This disclosure will provide various alternatives, examples, and operational techniques for those skilled in the art.

[First Modification]

Figure 22:
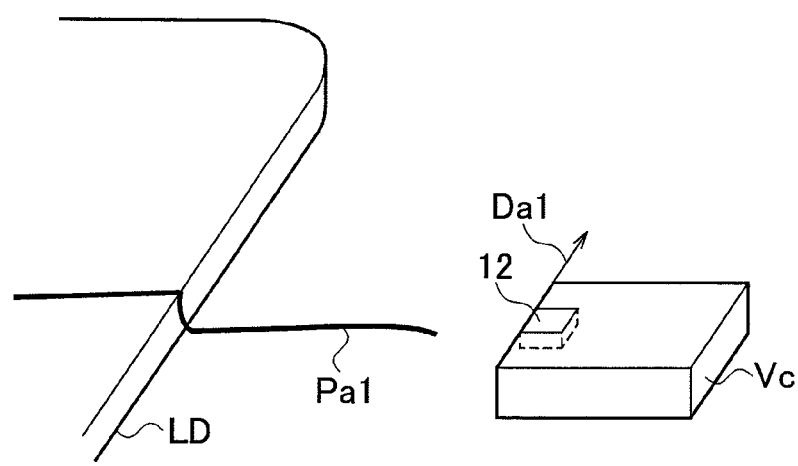
FIG. 22 is a perspective view illustrating an example of a step determination position ($Pa_1$) in the case where a stereo camera is installed on a lateral side of the vehicle Vc.

A stereo camera as the distance sensor 12 may be installed on a lateral side of the vehicle Vc as illustrated in FIG. 22, instead of in the front of the vehicle Vc, and the image capturing area of the stereo camera may be on the lateral side of the vehicle Vc. Also in this case, the first predetermined direction ($Da_1$) is set to be the traveling direction of the vehicle Vc. This allows the step determination position circuit 15 to set a first step determination position ($Pa_1$) crossing the step (LD) on the road surface around (on the lateral side of) the vehicle. Specifically, it is possible to set the step determination position ($Pa_1$) which is away from the distance sensor 12 in the first predetermined direction ($Da_1$) by the first predetermined distance and extends in a direction orthogonal to the first predetermined direction ($Da_1$). Although illustration is omitted, the second step determination position ($Pa_2$) can be set similarly.

[Second Modification]

Figure 23:
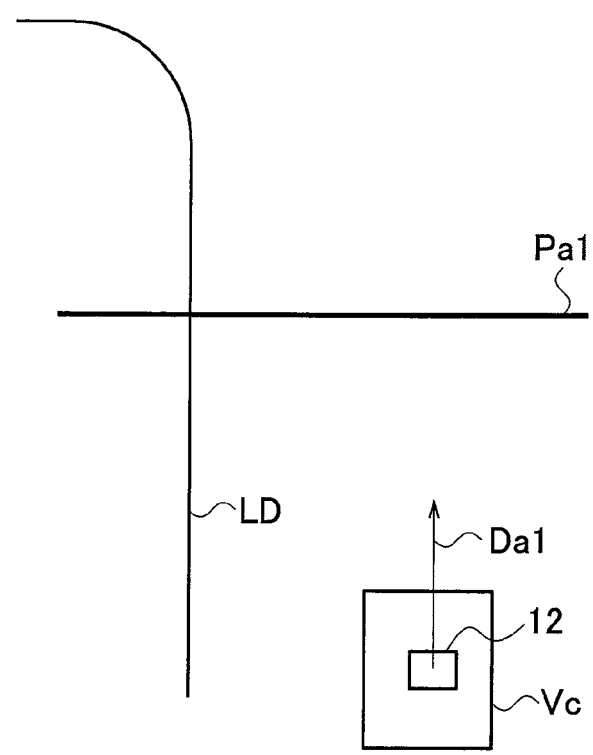
FIG. 23 is an overhead view illustrating an example of a 360-degree LRF in which an LRF (12) is installed at the center of the roof of the vehicle Vc, and the emission range is set to be the entire circumference of the vehicle.

Another example of the distance sensor 12 is a laser rangefinder (LRF). The LRF emits laser to objects around a vehicle, and measures the returned laser reflected by the objects. Thus, the LRF measure the direction in which an object is located based on the direction in which laser is emitted and measures the distance to the object based on the time from laser emission to reception of the reflected laser. An LRF is also called a laser scanner. The emission range of an LRF can be arbitrarily set. FIG. 23 illustrates an example of a 360-degree LRF in which an LRF (12) is installed at the center of the roof of a vehicle Vc, and the emission range is set to be the entire circumference. The step determination position circuit 15 set a first step determination position ($Pa_1$) which is away from the distance sensor 12 in a first predetermined direction ($Da_1$) by a first predetermined distance and extends in a direction orthogonal to the first predetermined direction ($Da_1$). Since, similarly to the example in FIGS. 2 and 3 in which the distance sensor 12 is installed in the front of the vehicle Vc, the first predetermined direction $Da_1$ is set to be the traveling direction of the vehicle Vc, the first step determination position ($Pa_1$) extending in the vehicle width direction is set ahead of the vehicle Vc. Although illustration is omitted, the second step determination position ($Pa_2$) can be set similarly.

Note that by installing the LRF with a depression angle, it is possible to survey over a wide range of the vehicle traveling direction during traveling. Alternatively, a multi-layer LRF capable of emitting multiple of lasers simultaneously can be used.

Figure 24:
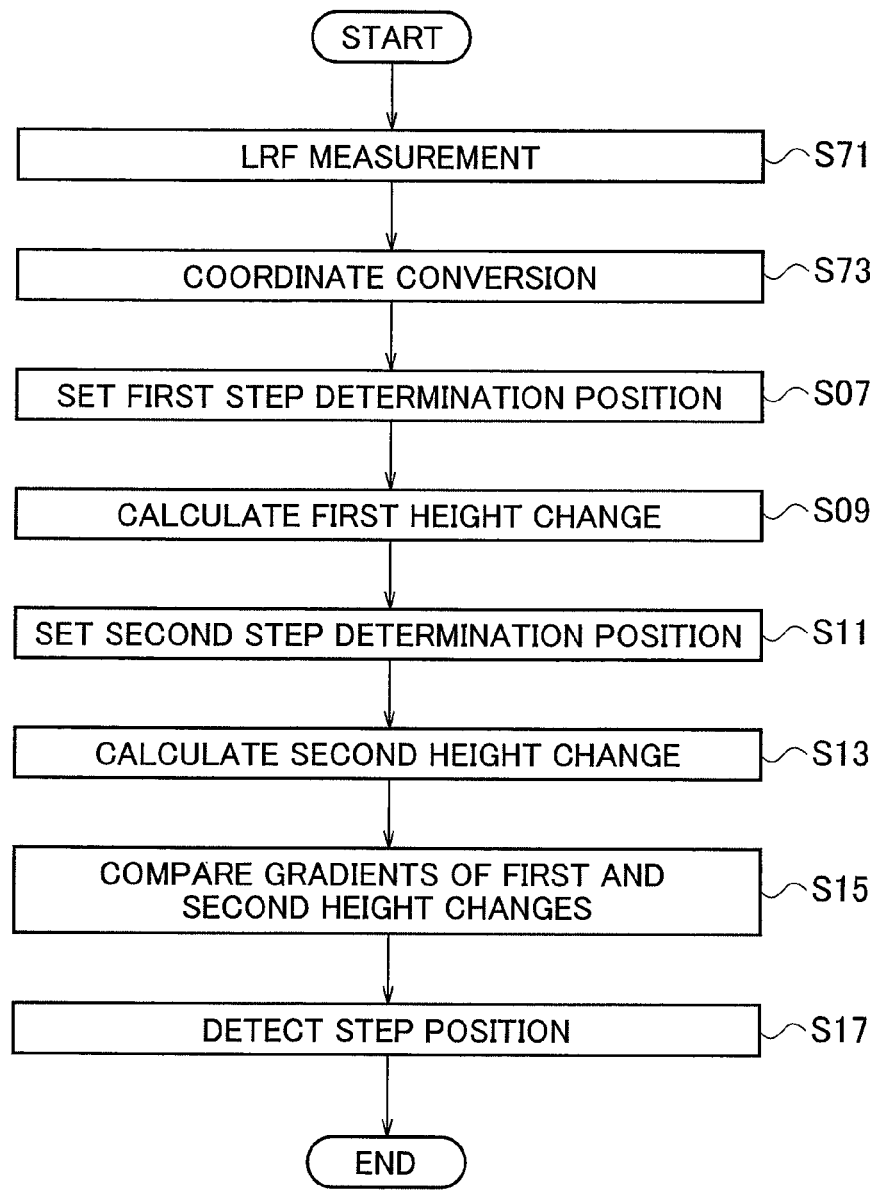
FIG. 24 is a flowchart illustrating an example of a step detection method in the case of using a laser rangefinder (LRF) as a distance sensor 12.

A step detection method using the laser rangefinder (LRF) as the distance sensor 12 is different in that steps S71 and S73 illustrated in FIG. 24 are executed instead of steps S01 to S05 in FIG. 6. The other steps S07 to S13 are the same as in FIG. 6, and descriptions thereof will be omitted.

At step S71, the LRF (12) measures the directions to objects to which the laser is emitted as well as the distances of the objects. Measurement data are transmitted to the arithmetic circuit 14. The process proceeds to step 73, where the arithmetic circuit 14 converts the measurement data in a polar coordinate system with the LRF (12) as the origin into data in an orthogonal coordinate system with the vehicle Vc as the origin. This allows the arithmetic circuit 14 to acquire three-dimensional information of the road surface around the vehicle. After that, the process proceeds to step S07.

REFERENCE SIGNS LIST 1 to 6 step detection device
11 distance measurement unit
12 distance sensor
13 microcomputer
14 arithmetic circuit
15 step determination position circuit
16 road surface height calculation circuit
18 step detection circuit
19 first comparator
20 second comparator
21 to 24 step existing area estimation circuit
HC road surface height changing portion
$Da_1$ first predetermined direction
$Da_2$ second predetermined direction
$Pa_1$ first step determination position
$Pa_2$ second step determination position
Rd stepped portion
Rr roadway
$Q_1$ to $Q_3$ step existing area
LD step endpoint
Vc vehicle

The invention claimed is:

1. A step detection device comprising:
a distance sensor which is mounted on a vehicle and detects a distance and a direction to a road surface around the vehicle;
a step determination position circuit which sets a first step determination position on the road surface, the first step determination position being away from the distance sensor in a first predetermined direction by a first predetermined distance and extending in a direction orthogonal to the first predetermined direction, and which sets a second step determination position on the road surface, the second step determination position being away from the distance sensor in a second predetermined direction different from the first predetermined direction by a second predetermined distance and extending in a direction orthogonal to the second predetermined direction;
a road surface height calculation circuit which calculates a height change of the road surface at the first step determination position and a height change of the road surface at the second step determination position, based on the distance and the direction to the road surface detected by the distance sensor; and a step detection circuit which detects a step on the road surface based on one of the first step determination position and the second step determination position, a gradient of the height change of the road surface at the one being larger than a gradient of the height change of the road surface at the other.

2. The step detection device according to claim 1, wherein if the gradient of the height change of the road surface at one of the first step determination position and the second step determination position is larger than or equal to a threshold, the step detection circuit detects the step on the road surface based on the height change of the road surface at the one, the gradient of the height change of the road surface at the one being larger than or equal to the threshold.

3. The step detection device according to claim 1, further comprising a step existing area estimation circuit which estimates a step existing area in which the step exists at the first step determination position, wherein
the step determination position circuit sets the second step determination position passing through the step existing area.

4. The step detection device according to claim 3, wherein the step existing area estimation circuit estimates the step existing area based on the height change of the road surface at the first step determination position.

5. The step detection device according to claim 3, wherein the step detection circuit repeatedly detects the step on the road surface at predetermined intervals, and
the step existing area estimation circuit estimates the step existing area based on a position of the step which was previously detected.

6. The step detection device according to claim 3, wherein the step determination position circuit sets a plurality of the first step determination positions,
the step detection circuit tries to detect the step on the road surface for every first step determination position, and
the step existing area estimation circuit estimates the step existing area based on a position of the step which was successfully detected.

7. The step detection device according to claim 3, further comprising:
a map acquisition circuit which acquires map information on surroundings of the vehicle; and a self-position estimation circuit which estimates a position of the vehicle on a map, wherein
the step existing area estimation circuit estimates the step existing area based on the estimated position of the vehicle on the map.

8. The step detection device according to claim 1, wherein if the gradient of the height change of the road surface at the first step determination position is larger than or equal to a threshold, the road surface height calculation circuit does not calculate the height change of the road surface at the second step determination position, and the step detection circuit detects the step on the road surface based on the height change of the road surface at the first step determination position.

9. A step detection method comprising:
detecting a distance and a direction to a road surface around a vehicle using a distance sensor mounted on the vehicle;
setting a first step determination position on the road surface, the first step determination position being away from the distance sensor in a first predetermined direction by a first predetermined distance and extending in a direction orthogonal to the first predetermined direction;
setting a second step determination position on the road surface, the second step determination position being away from the distance sensor in a second predetermined direction different from the first predetermined direction by a second predetermined distance and extending in a direction orthogonal to the second predetermined direction;
calculating a height change of the road surface at the first step determination position and a height change of the road surface at the second step determination position, based on the distance and the direction to the road surface detected by the distance sensor; and
detecting a step on the road surface based on one of the first step determination position and the second step determination position, a gradient of the height change of the road surface at the one being larger than a gradient of the height change of the road surface at the other.

* * * * *